US006782162B2

(12) United States Patent
Fukuzawa et al.

(10) Patent No.: US 6,782,162 B2
(45) Date of Patent: Aug. 24, 2004

(54) OPTICAL MODULE AND METHOD FOR ASSEMBLING THE SAME

(75) Inventors: Takashi Fukuzawa, Osaka (JP); Hiroyuki Tanaka, Osaka (JP); Ikuto Ohyama, Osaka (JP); Takeshi Ishimaru, Osaka (JP); Minoru Taniyama, Osaka (JP); Shigeo Kittaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 9 days.

(21) Appl. No.: 10/212,416

(22) Filed: Aug. 5, 2002

(65) Prior Publication Data
US 2003/0026540 A1 Feb. 6, 2003

(30) Foreign Application Priority Data

Aug. 6, 2001 (JP) ...................................... 2001-237452
Jun. 6, 2002 (JP) ...................................... 2002-166011
Jun. 11, 2002 (JP) ...................................... 2002-169951

(51) Int. Cl.$^7$ ............................ G02B 6/32; G02B 6/26; G02B 6/42
(52) U.S. Cl. .............................. 385/34; 385/35; 385/52
(58) Field of Search ............................. 385/31, 33–35, 385/52, 73, 74

(56) References Cited

U.S. PATENT DOCUMENTS

| | | | | |
|---|---|---|---|---|
| 5,917,626 A | * | 6/1999 | Lee ............................... | 398/88 |
| 5,943,454 A | * | 8/1999 | Aksyuk et al. ................ | 385/22 |
| 6,014,484 A | * | 1/2000 | Duck et al. .................... | 385/34 |
| 6,040,944 A | * | 3/2000 | Pan et al. ..................... | 359/590 |
| 6,168,319 B1 | * | 1/2001 | Francis .......................... | 385/79 |
| 6,185,347 B1 | * | 2/2001 | Zheng ........................... | 385/34 |
| 6,246,812 B1 | * | 6/2001 | Liu et al. ...................... | 385/34 |
| 6,272,272 B1 | * | 8/2001 | Ford ............................. | 385/52 |
| 6,282,339 B1 | * | 8/2001 | Zheng ........................... | 385/34 |
| 6,343,166 B1 | * | 1/2002 | Hellman et al. .............. | 385/31 |

* cited by examiner

Primary Examiner—Edward J. Glick
Assistant Examiner—Thomas R Artman
(74) Attorney, Agent, or Firm—Crompton, Seager & Tufte, LLC

(57) ABSTRACT

An optical module which satisfies a required insertion loss and can be easily assembled with high productivity. The optical module includes first optical fiber, a first lens, an optical device, a second lens, and second optical fiber. The first lens receives an incident light from the first optical fiber and converts the incident light into a parallel light. The optical device receives the parallel light and performs predetermined optical processing on the parallel light. The second lens receives a transmitted parallel light from the optical device and converge the transmitted parallel light to produce an outgoing light. The second optical fiber receives the outgoing light. An optical axis of the first lens and an optical axis of the second lens are substantially coincident with each other. An optical axis of the first optical fiber and an optical axis of the second optical fiber are substantially parallel with each other and substantially parallel to the optical axes of the first and the second lenses.

37 Claims, 15 Drawing Sheets

Movement in z-axis direction (mm)

θ y (degree) oblique angle in horizontal direction

Fiber Offset (μm)

Fig.17

Two lenses used here were the same.

| | Unit | Estimated allowable accuracy at loss of 0.2 dB | Example 1 Allowable accuracy | Example 2 Allowable accuracy | Example 3 Allowable accuracy | Comparative Example 1 Allowable accuracy | Comparative Example 2 Allowable accuracy |
|---|---|---|---|---|---|---|---|
| Displacement of the filter from the focal position (Condition 1) | mm | 0.5 | <0.07 | 0.25 | 0.5 | 0.07 | 0.16 |
| Displacement of the filter from the focal position (Condition 1) | % | 25 | <3.5 | 13 | 25 | 3.5 | 8 |
| Displacement of the distance between lenses from 2f (Condition 3) | mm | 1.0 | 0.5 | 0 | 1 | 0.5 | 1.5 |
| Displacement of the distance between lenses from 2f (Condition 3) | % | 25 | 13 | 0 | 25 | 13 | 39 |
| Oblique angles of the first, the second optical fiber $\theta x, \theta y$ (Condition 2) | Degree | 1.5 | <0.2 | <0.2 | <0.2 | <0.5 | 0.2 |
| Oblique angles of the third optical fiber $\theta x, \theta y$ (Condition 2) | Degree | 1.5 | <0.2 | <0.2 | <0.2 | <0.5 | 0.2 |
| Oblique angle at the end face of the lens side of the first lens $\theta x, \theta y$ (Condition 7) | Degree | 10 | <0.35 | <0.35 | <0.35 | <0.35 | <0.35 |
| Oblique angle at the end face of the lens side of the second lens $\theta x, \theta y$ (Condition 7) | Degree | 10 | <0.35 | <0.35 | <0.35 | <0.35 | <0.35 |
| Oblique angle at the end face of the fiber side of the first lens $\theta x, \theta y$ (Condition 7) | Degree | 2.5 | <0.5 | <0.5 | <0.5 | <0.5 | <0.5 |
| Oblique angle at the end face of the fiber side of the second lens $\theta x, \theta y$ (Condition 7) | Degree | 2.5 | <0.5 | <0.5 | <0.5 | <0.5 | <0.5 |
| Oblique angle of two lenses (Condition 6) | Degree | 1.5 | <0.85 | <0.85 | <0.85 | <0.85 | <0.85 |
| Optical axis displacement between two lenses (Condition 4) | μm | 50 | <30 | <30 | <30 | <30 | <30 |
| Optical axis displacement between two lenses (Condition 4) | % | 2.5 | <1.5 | <1.5 | <1.5 | <1.5 | <1.5 |
| Angle displacement $\theta z$ of each lens (Condition 5) | Degree | 20 | <20 | <20 | 0 | 20 | 0 |
| Reflected side loss (average/deviation/worst-case in mass-production) | dB | | 0.20/0.04/0.25 | 0.23 | 0.34 | 0.22/0.07/0.39 | 0.23 |
| Transmitted side loss (average/deviation/worst-case in mass-production) | dB | | 0.21/0.05/0.32 | 0.19 | 0.37 | 0.34/0.17/0.74 | 0.55 |
| Lens type | | | Oblique 8 | Oblique 8 | Flat lens | Oblique 8 | Flat lens |
| Lens length | | | 0.25 pitch | 0.23 pitch | 0.24 pitch | 0.25 pitch | 0.24 pitch |
| Focal distance | mm | | 1.95 | 1.97 | 1.96 | 1.95 | 1.96 |

OPTICAL MODULE AND METHOD FOR ASSEMBLING THE SAME

BACKGROUND OF THE INVENTION

The present invention relates to an optical module for use in a field of an optical communication, and more particularly, to an optical module including a collimator comprising an optical fiber and a lens.

In a field of an optical communication, when it is required to give an action to a light transmitted through an optical fiber, an optical device is inserted in an optical path. Since a light emitting from the optical fiber diverges, a collimator which converts a diverging light to a parallel light is used in order to efficiently introduce the light to the optical device. The collimator and the optical device are practically modularized to be used as the optical module.

FIG. 1 shows, as one example of the optical module, a filter module 200 which separates a light of a multiplexed wavelength in the optical communication of a wavelength multiplex system.

Now, a light having two multiplexed wavelengths λ1, λ2 enters a lens 121 from an optical fiber 111. The lens 121 is a gradient index rod lens, whose refractive index is distributed in a radial direction of a circular section perpendicular to an optical axis. When a lens length of the lens 121 is adequately designed, a diverging light entered from the optical fiber 111 is converted to a parallel light. A spectral separation optical filter 150 which is an optical device is arranged in contact with an end face opposite to a light receiving surface (an end face opposed to the optical fiber 111) of the lens 121. The optical filter 150 reflects the light having a wavelength λ1 and transmits the light having the wavelength λ2. The light reflected by the optical filter 150 is converged by the lens 121 and enters an optical fiber 113.

The light (wavelength λ2) transmitted through the optical filter 150 enters a lens 122, is converged therein and then enters an optical fiber 112. Generally, the lens 121 and the lens 122 have the same characteristics. An optical system is integrated into one housing 170 to constitute the optical filter module 200.

A basic optical system of the collimator used for the optical module will be described in accordance with FIG. 2. Now, consider a case where point light sources 211, 213 are arranged on one focal surface 281 of a first convex lens 221, and on an optical axis 201 and at a position ΔP separated from the optical axis 201, respectively, as shown in FIG. 2A. In view of geometrical optics, a light from the light source on the focal surface 281 is converted to a parallel light by the convex lens 221. However, unless the position of the light source exists on the optical axis 201, the direction of the parallel light inclines with reference to the optical axis 201 in accordance with the position ΔP of the light source. When the parallel light beam enters a second convex lens 222 having the same focal distance as the first convex lens 221, images 212, 214 are formed at positions symmetrical with respect to the light sources 211, 213 regarding both the lenses 221, 222.

A traveling state of the light beam is the same as shown in FIG. 2B, even when the lenses are gradient index rod lenses 321, 322. The rod lenses 321, 322 are cylindrical, whose refractive indexes are distributed along radial directions from the cross sectional center. A refractive index distribution n(r) is ideally represented by the following equation:

$$n(r) = n_0(1 - (A/2)r^2)$$

wherein r is a distance from a center axis of the lens, $n_0$ is a refractive index on a center axis of the lens, $A^{1/2}$ is a refractive index distribution constant. A meandering period (pitch) P of the light beam in the gradient index rod lens is represented by $P = 2\pi/A^{1/2}$. Here, for simplification, the gradient index rod lens having a lens length of 0.25 P is illustrated. In the lens of 0.25 P, a light generated from the point source light on the end face is converted to a parallel light beam and then emitted.

A case where point light sources 311, 313 are arranged on one end face of a first convex lens 321 on an optical axis 301 at a spaced-apart position ΔP from the optical axis 301 respectively is considered. However, unless the position of the light source exists on the optical axis, the direction of the parallel light inclines with reference to the optical axis depending upon the position ΔP of the light source in the same manner as in the convex lens. When the parallel light enters a second convex lens 322 having the same pitch as the first lens 321, images 312, 314 are formed at the symmetrical position of the light source relative to both lenses 321, 322.

Generally, when two lenses having limited effective diameters are arranged on the same optical axis, the optical axis inclines when a distance L between the lenses increases, consequently there is a case where a part of the light can not enter the second lens.

In the case of the optical filter module 200 shown in FIG. 1, since each of optical fibers 111, 113 has a limited diameter, at least one optical fiber is arranged apart from the center axis of lens. The light entering and emitted from the optical fiber arranged apart from the center axis of lens has predetermined angle with respect to the center axis at another end face of the lens.

For example, when the optical axis of the optical fiber 111 is coincident with the center axis of the lens 121, the incident light toward the lens becomes parallel relative to the center axis of the lens at the emitting end of the lens and is emitted perpendicularly with reference to the end face of the lens. In this case, however, since a part of the light which is reflected at the end face of the lens returns to the optical fiber 111, the reflected return light is undesirable for the optical communication. When in manufacturing the optical module, it is not always easy to frequently adjust the position of the incident light to perpendicularly emit the light from the end face of the lens, even if a reflected return light problem may not be considered.

Actually, as shown in FIG. 1, the end face of the optical fiber 111 and the face of the lens opposed to the optical fiber are normally formed to incline relative to the optical axis in order to prevent the reflected return light. In addition, even when the light enters from the lens face inclined with respect to the optical axis, the outgoing light from the lens inclines with respect to the optical axis.

A method will be considered to incline the center axis of the lens 122 relative to the optical axes of the optical fiber 111 and the lens 121 in order to converge the light having a given angle relative to the center axis of the lens 121 and to introduce thereto with a low loss. According to the method, the center axes of lenses 121 and 122 are arranged with a predetermined angle in the optical filter module 200 in FIG. 1. In this case, it is necessary for an inside diameter of a sleeve 160 to be largely formed than that of a glass holder 144 to keep a sufficient space for adjusting the angle.

Now, the assembly process of the optical filter module 200 will be described below.

First, the collimator 201 including two optical fibers 111, 113, the lens 121 and the optical filter 150 is assembled. Distal ends of two optical fibers are inserted into a capillary 131 having, for example, two holes and secured thereto with an adhesive, and then the end face of the capillary 131 is polished. The capillary with optical fibers 131 is inserted into a glass holder 140 capped with a cylindrical metal tube and secured thereto with the adhesive.

The optical filter 150 is adhered to the end face of lens 121. The lens 121 is inserted into the glass holder 142, and secured thereto with the adhesive. In this case, the light having the wavelength $\lambda 1$ enters the lens 121 from the optical fiber 111, and the capillary 131 and the lens 121 are adjusted so that the reflected light from the optical filter 150 becomes a maximum amount. A core adjustment is performed with respect to three directions, an x1-axis, a y1-axis, and a z1-axis. Where, the x1-axis and the y1-axis are perpendicularly oriented relative to the center axis of lens 121, and are mutually oriented to two directions at a right angle as well, and the z1-axis is oriented to the optical axis direction of lens 121.

Then, the collimator 202 including the lens 122 and the optical fiber 112 is assembled. The lens 122 and the optical fiber 112 secured to the capillary 132 are inserted into a common metal holder 144 and are adjusted in the z2-axis and secured thereto. The z2-axis is oriented to the optical axis of the lens 122.

Next, two sets of collimators 201, 202 are combined together and the optical filter module 200 is assembled. It is necessary that a z1-axis and a z2-axis are obliquely set with respect to the optical axis direction. At this time, the X-axis, the Y-axis, and oblique angles $\theta x$, $\theta y$ are adjusted so that the light amount coupled to the optical fiber 112 becomes the maximum value by means of introducing the light having the $\lambda 2$ wavelength from the optical fiber 111. Where, the X-axis and the Y-axis are perpendicularly oriented relative to the center axis (Z-axis) of the housing 170 and are mutually oriented at a right angle, the oblique angle $\theta x$ is a vertically oriented angle with respect to the center axis (Z-axis), the oblique angle $\theta y$ is a horizontally oriented angle with respect to the center axis (Z-axis). The core adjustment of the center axis 170 in the center axis direction may be performed but there is a case to omit this procedure because of a troublesome operation.

A small diameter beam is used for the optical filter module 200. Because of that reason, when an angle displacement between two collimators 201, 202 exceeds 0.02 degrees, the module 200, therefore, can not be used due to an increase of the light loss. Mechanical stability of the optical filter module 200 must be maintained in the operating temperature range, for example −20 to 70° C. Because of this, a solder is generally used to fill a relatively large space and secure the lens and the optical fiber with high reliability. Although resins are easy to be handled, they are not suitable because of shrinkage in curing and of a large coefficient of thermal expansion.

In the optical filter module 200, glass holders 140, 142, 144 capped with the sleeve 160 and the metal tube are secured by the solder 180. The solder is poured into the sleeve 160 from a solder injection port 182. The housing 170 and the sleeve 160 are secured by the resin 190 for protecting the optical fiber.

Because the assembly of an existing optical module requires the core adjustment process frequently, there is a problem to take a long time for it. In addition, a displacement of the adjusted core position is easy to occur in a high temperature state where a solder is melted and in a cooling back thereof, since the solder is used. Because of this, there are problems that yield becomes low and the productivity is decreased.

Furthermore, the resin is easy to deteriorate with heat in solder melting since the resin is used for securing the optical fiber and the capillary, and the capillary and the lens. The deteriorated resin may be a cause of a problem in terms of long-term reliability of the optical module. A special treatment is required such that the holder of the capillary is capped with the metal tube and gold plating is formed on the outside of the metal tube and the inside of the lens and the sleeve or the like because of the securing with the solder. In addition, port processing for pouring the solder into the sleeve is required.

Furthermore, because two collimators are obliquely secured to each other, there is an inconvenience that the whole is upsized and a large space is required therein.

As another optical filter module, an optical filter module 511 including an optical system as shown in FIG. 3, for example, is proposed by the present inventors. An optical filter module 511 includes a predetermined integrated first lens 512 and a second lens 513, the optical filter 514 arranged between both lenses, two optical fibers 515, 516 arranged on an incident side of the first lens 512, and one optical fiber 517 arranged on an emitting side of the second lens 513 so that each of optical axes becomes substantially coaxial.

Two optical fibers 515, 516 are secured so that optical fiber axes become parallel substantially. Each of the optical fibers 515, 516 is separately arranged on both sides of the optical axis C with the same distance $\Delta P1$ deviated therefrom. The optical fiber 517 is arranged on the same side of the optical axis C as the optical fiber 516 with the same distance $\Delta P1$ deviated therefrom. The same lens having a focal distance f is used as the first lens 512 and the second lens 513, a distance between lenses is set by 2f and the optical filter 514 is arranged at a focal position of the lens 512.

When the optical filter module 511 emits a light having a wavelength region transmitting through the optical filter 514 from the optical fiber 515, the light is collimated by the first lens 512 and transmits through the optical filter 514, and the transmitted light is converged by the second lens 513 and is adapted to enter the optical fiber 517. In addition, when the optical filter module 511 emits the light having the wavelength region reflected by the optical filter 514 from the optical fiber 515, the light is collimated by the first lens 512 and reflected by the optical filter 514, and the light is converged by the first lens 512 and is adapted to enter the optical fiber 516.

The following core adjustment operations (a) to (d) are required to assemble the optical filter module 511 shown in FIG. 3. The core adjustment operation required for the optical filter module 511 assembly will be described below.

The light propagating in the optical fiber is not completely confined in the core, and the light in the bottom part of the intensity distribution seeps in a cladding. In the case of a single mode optical fiber, an outgoing light is a Gaussian beam showing an intensity distribution similar to Gaussian distribution-shaped (the distribution that intensity is strong in the center of the light flux, and becomes gradually week at a peripheral portion) in the plane perpendicular relative to the optical fiber axis. In other words, the outgoing light from the optical fiber 515 (Gaussian beam) is collimated by the first lens 512 but does not become the parallel light between both lenses 512, 513 and a beam waist is formed therebetween. The light converged by the second lens 513 does not converge at one point but the beam waist is formed.

(a) A core-adjustment operation to make an end face of the optical fiber 516 coincide with a position of a beam waist of a light wherein the light having a wavelength region reflected by a filter 514 is emitted from the optical fiber 515, then the light reflected by the optical filter 514 is converged by the first lens 512 and enters the optical fiber 516.

In this operation, the reflected light by the optical filter 514 emitted from the optical fiber on a reflecting port side is monitored, and the cores of the optical fibers 515, 516 are adjusted in the X, Y, and Z direction so that the light amount of the reflected light becomes maximum amount.

Further, the core adjustment operation wherein the light having a wavelength region transmitted the optical filter 514 is emitted from the optical fiber 515, the light transmitted through the optical filter 514 is converged by the second lens 513 then a position of the beam waist of the light entering the optical fiber 517 and the end face of the optical fiber 517 is adapted to coincide.

In this operation, the transmitted light of the optical filter 514 emitted from the optical fiber 517 is monitored, and the core of the optical fiber 517 is adjusted in the X, Y, and Z directions so that the light amount of the transmitted light becomes maximum amount.

(b) A core adjustment operation to make coincide with a mode field diameter and a beam waist diameter of each of optical fibers 515 to 517 respectively.

In this operation, the same lens is used for both lenses 512, 513. Therefore, a position of the beam waist of the light emitted from the optical fiber 515 and a position of the beam waist of the light entering the optical fiber 517 become symmetry with reference to the optical axis C, and a diameter of the mode field and a diameter of the beam waist of the optical fibers 515, 517 wherein the core adjustment operation (a) was performed are coincident with each other. In addition, a position of the beam waist of the light emitted from the optical fiber 515 and a position of the beam waist of the light entering the optical fiber 516 become symmetry with reference to the optical axis C, a diameter of the mode field and a diameter of the beam waist of each of optical fibers 515, 516 wherein the core adjustment operation (a) was performed are coincident with each other. "A mode field diameter" is a diameter of a beam having an intensity of $1/C^2$ of peak of a Gaussian distribution-shaped intensity distribution.

(c) A core adjustment operation to make an optical fiber axis of each of optical fibers 515 to 517 and a principal ray of the beam coincide with each other.

In this operation, a vertical oblique angle $\theta x$ with respect to the optical axis C and a horizontal oblique angle $\theta y$ with respect to the optical axis C are adjusted respectively for each of optical fibers 515 to 517.

(d) A core adjustment operation to avoid an eclipse of beam on the way.

In this operation, a vertical oblique angle of $\theta x$ with respect to the optical axis C and a horizontal oblique angle $\theta y$ with respect to the optical axis C are adjusted respectively for both lenses 512, 513.

For the optical filter module 511, it takes time to perform the core adjustment operation of all (a) to (d) to obtain the required insertion loss of the optical filter module and takes long time to assemble the optical filter module. Therefore, productivity of the optical filter module becomes low and cost therefor will be elevated.

SUMMARY OF THE INVENTION

It is an object of this invention to provide an optical module which satisfies a required insertion loss and can be easily assembled with high productivity.

To achieve the above object, the present invention provides an optical module. The optical module includes a first optical fiber and a first lens. The first lens is optically coupled with the first optical fiber to receive an incident light from the first optical fiber and to convert the incident light into a parallel light. An optical device receives the parallel light and performs predetermined optical processing on the parallel light. A second lens receives a transmitted parallel light from the optical device and converges the transmitted parallel light to produce an outgoing light. A second optical fiber is optically coupled with the second lens and receives the outgoing light. An optical axis of the first lens and an optical axis of the second lens are substantially coincident with each other. An optical axis of the first optical fiber and an optical axis of the second optical fiber are substantially parallel with each other and substantially parallel to the optical axes of the first and the second lenses.

A further perspective of the present invention is a method for assembling an optical module. The optical module includes a first optical fiber, a first lens, optically coupled with the first optical fiber, for receiving an incident light from the first optical fiber and converting the incident light into a parallel light; an optical device for receiving the parallel light and performing predetermined optical processing on the parallel light, a second lens for receiving a transmitted parallel light from the optical device and converging the transmitted parallel light to produce an outgoing light, and a second optical fiber, optically coupled with the second lens, for receiving the outgoing light. The method includes making an optical axis of the first lens and an optical axis of the second lens coincide with each other, securing the optical device to a predetermined position between the first and the second lenses, securing the first and the second lenses so that a distance between a center of a light emitting face of the first lens and a center of a light receiving face of the second lens opposed to the first lens becomes a predetermined value, arranging the first and the second optical fibers in parallel with optical axes of the first and the second lenses, introducing a light having a predetermined wavelength and transmitting through the optical device into the first lens from the first optical fiber, adjusting at least either of a relative position between the first optical fiber and the first lens and a relative position between the second optical fiber and the second lens in the same direction as an optical axis of the lens and in two directions perpendicular to the optical axis thereof so that a light amount which enters the second optical fiber becomes larger than a predetermined value, and securing a whole optical module by keeping the adjusted conditions.

A further perspective of the present invention is a method for assembling an optical module. The optical module includes a first optical fiber; a first lens, optically coupled with the first optical fiber, for receiving an incident light from the first optical fiber and converting the incident light into a parallel light, an optical device, for receiving the parallel light and performing predetermined optical processing on the parallel light, a third optical fiber, optically coupled with the first lens, and having an axis in parallel with the optical axis of the first optical fiber and separated as much as a predetermined distance, a second lens, for receiving a transmitted parallel light from the optical device and converging the transmitted parallel light to produce an outgoing light, and a second optical fiber, optically coupled with the second lens, for receiving the outgoing light. The first lens converges the parallel light reflected by the optical device, produces a reflected outgoing light, and provides the reflected outgoing light to the third optical fiber. The method includes making an optical axis of a first lens and an optical axis of a second lens substantially coincident with each other, securing the optical device to a predetermined position between the first and the second lenses, securing the first and the second lenses so that a distance between a center of a light emitting face of the first lens and a center of a light receiving surface of the second lens opposed to the first lens becomes a predetermined value, arranging the first and the second optical fibers in parallel with optical axes of the first and the second lenses, introducing a light having a predetermined wavelength reflected by the optical device and a light having a predetermined wavelength transmitting through the optical device separately or concurrently into the first lens from the first optical fiber, adjusting a relative position between the first optical fiber and the first lens in the same direction as an optical axis of the lens and in two directions perpendicular to the optical axis thereof so that a light amount which enters the third optical fiber becomes larger than a predetermined value, adjusting a relative position between the second optical fiber and the second lens in the same direction as an optical axis of the lens and in two vertical directions to the optical axis thereof so that a light amount which enters the second optical fiber becomes larger than a predetermined value, and securing a whole optical module keeping the adjusted conditions.

A further perspective of the present invention is a method for assembling an optical module. The optical module includes a first optical fiber; a first lens, optically coupled with the first optical fiber, for receiving an incident light from the first optical fiber and converting the incident light into a parallel light, an optical device, for receiving the parallel light and performing predetermined optical processing on the parallel light, a third optical fiber, optically coupled with the first lens, and having an axis in parallel with the optical axis of the first optical fiber and separated as much as a predetermined distance; a second lens, for receiving a transmitted parallel light from the optical device and converging the transmitted parallel light to produce an outgoing light; and a second optical fiber, optically coupled with the second lens, for receiving the outgoing light. The first lens has a focal point with a focal distance f, converges the parallel light reflected by the optical device, produces a reflected outgoing light, and provides the reflected outgoing light to the third optical fiber. The method includes arranging the first lens and the second lens so that an optical axis of the first lens and an optical axis of the second lens are substantially coincident with each other, arranging the optical device at a predetermined position between the first lens and the second lens so that a displacement amount from a focal point of the first lens is within ±25% of a focal length of the first lens, coupling the first and the third optical fibers with the first lens so that each of a vertical oblique angle θx and a horizontal oblique angle θy with respect to the optical axis of the first lens is within 0.2 degrees, and coupling the second optical fiber with the second lens so that each of a vertical oblique angle θx and a horizontal oblique angle θy with respect to the optical axis of the second lens is within 0.2 degrees.

Other aspects and advantages of the invention will become apparent from the following description, taken in conjunction with the accompanying drawings, illustrating by way of example the principles of the invention.

BRIEF DESCRIPTION OF THE DRAWING

The invention, together with objects and advantages thereof, may best be understood by reference to the following description of the presently preferred embodiments together with the accompanying drawings in which:

FIG. 17 is view showing an example and a comparative example in accordance with the fourth embodiment.

DETAILED DESCRIPTION OF THE PREFERRED EMBODIMENTS

Figure 1:
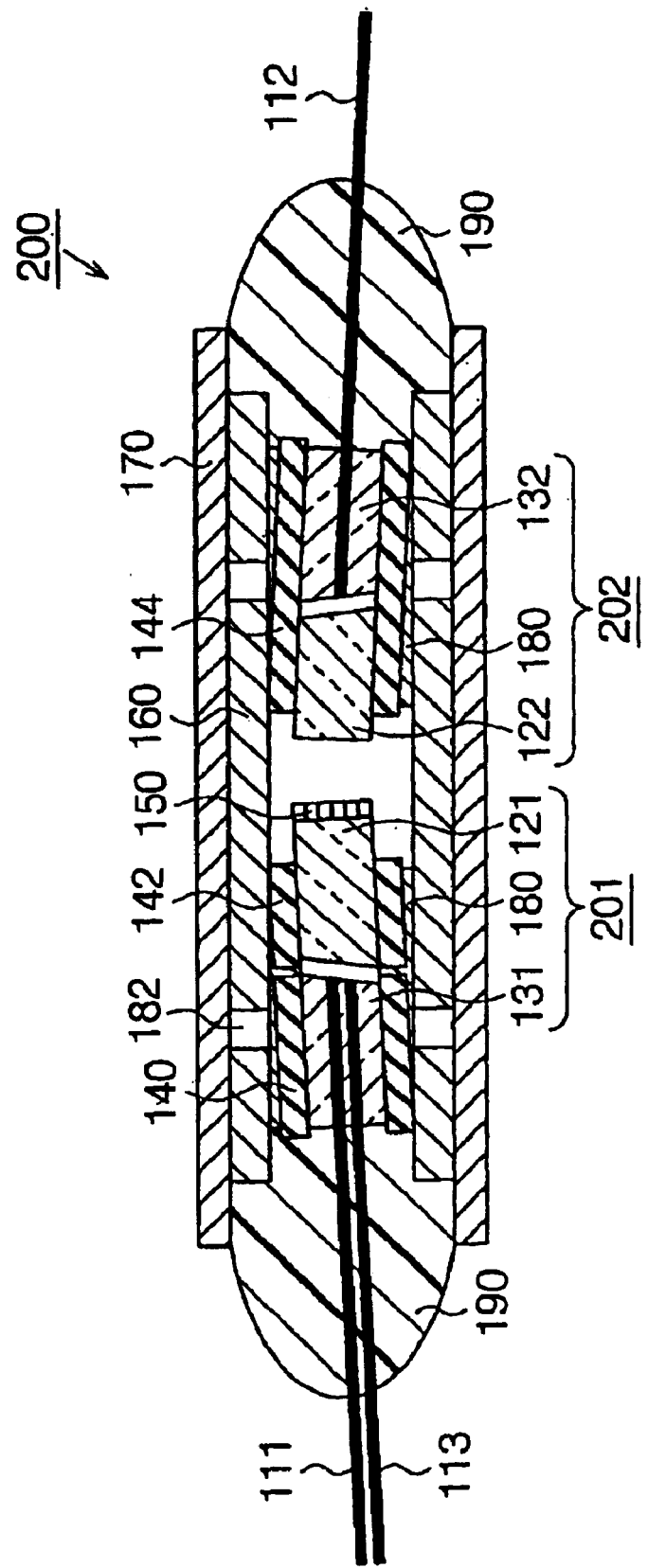
FIG. 1 shows a cross sectional view of an optical filter module of the prior art.
Figure 2A:
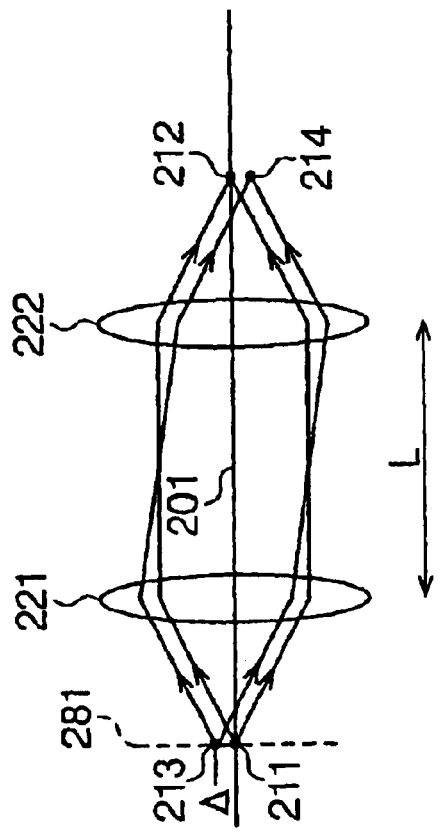
FIGS. 2A and 2B show illustrations of an optical system of a collimator.
Figure 2B:
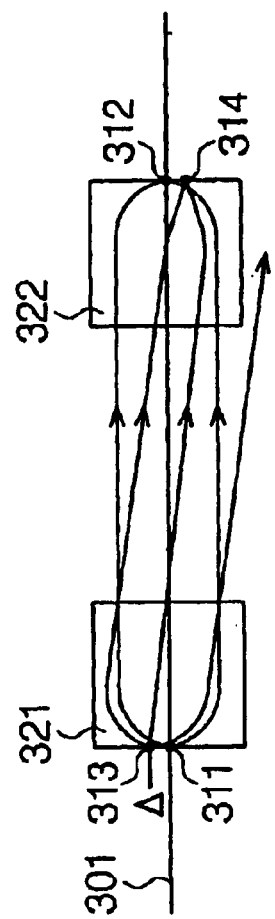

In the drawings, like numerals are used for like elements throughout.

Figure 3:
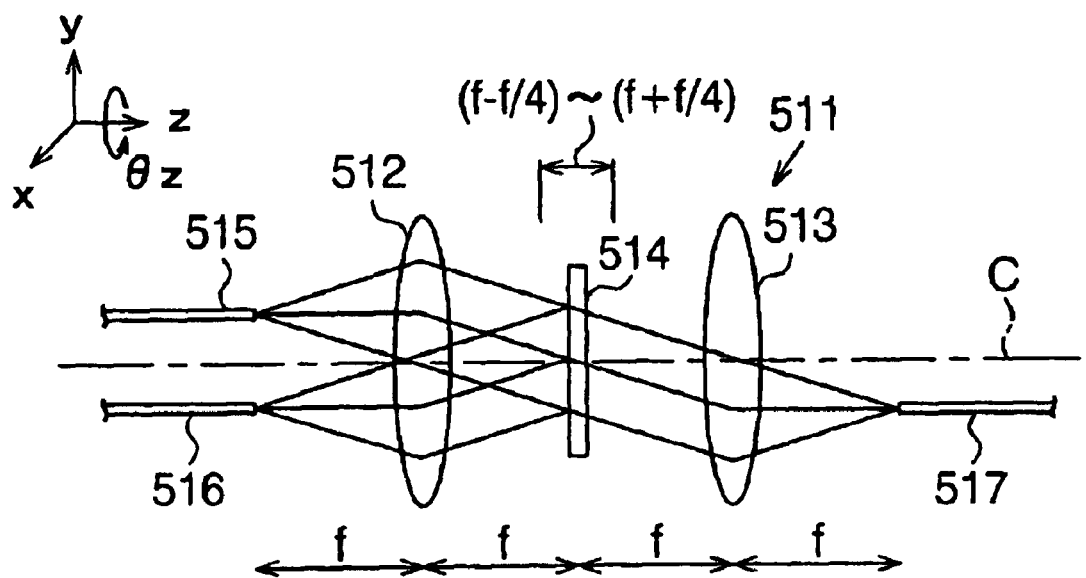
FIG. 3 is a constitutional view showing an optical system of another optical filter module using a spherical lens known to the prior art.
Figure 4:
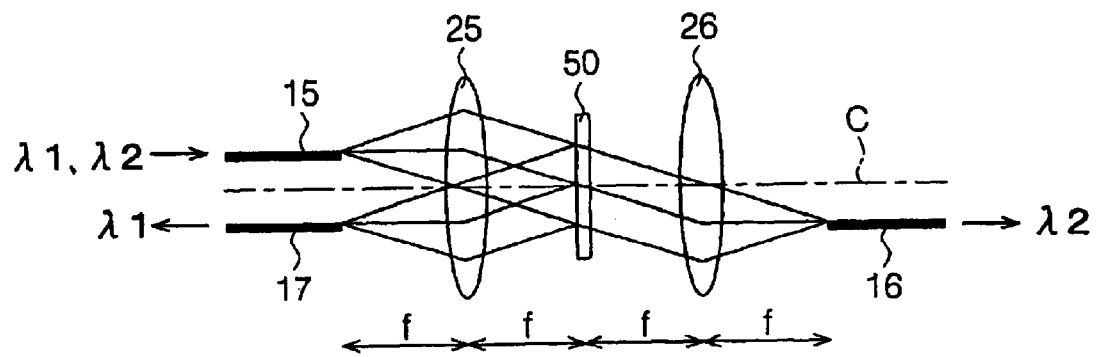
FIG. 4 is a view showing an optical system of an optical module according to a first embodiment of the present invention.

FIG. 4 shows a basic optical system of an optical module 100 in accordance with a first embodiment of the present invention. Because a configuration of the optical system of FIG. 4 is substantially equal to that of FIG. 3, the optical system in FIG. 4 will be briefly explained below.

A light having wavelengths λ1 and λ2 is emitted from an optical fiber 15 and enters a first convex lens 25. An optical axis of the optical fiber 15 is parallel with an optical axis C of the lens and an emitting end face of the optical fiber 15 is positioned on a focal surface of the lens 25 (a distance between the emitting end face of the optical fiber and a main face of the lens 25 is equal to a focal distance f of the lens). An outgoing light from the optical fiber 15 is converted to a parallel light by the lens 25.

The parallel light emitted from the lens 25 enters a spectral separation optical filter (optical device) 50. The spectral separation optical filter 50 is arranged on a focal surface of the opposite side to the optical fiber 15 (arranged at a position of distance f from the main surface of the lens 25). The optical filter 50 reflects the light having the wavelength λ1 and transmits the light having the wavelength λ2. The light having the wavelength λ1 reflected by the optical filter 50 is converged by the lens 25 and enters an optical fiber 17. An optical axis of the optical fiber 17 is parallel to the optical axis C of the lens and an incident end plane of the optical fiber 17 is positioned on the focal plane of the lens 25.

The light transmitted the optical filter 50 is converged by a second convex lens 26 arranged so that the optical axis is coincident with that of the lens 25 and enters an optical fiber 16. The second lens 26 has the same characteristic as the first lens 25. An optical axis of the optical fiber 16 is parallel to the optical axis C of lens, and an incident end plane of the optical fiber 16 is positioned on a focal plane of the lens 26. A beam waist is formed at a position of the spectral separation optical filter spacing a focal distance f from the end face of each optical fiber and both lenses.

Each of the optical fibers 15, 17 is arranged in symmetry with respect to the optical axis C of the lens in a position with a ΔP1 distance therefrom. In this case, the parallel light emitted from the first lens 25 is inclined with respect to the optical axis C of the lens. Therefore, the focal distance f of the lens is preferably shorter for downsizing of the optical system.

Figure 5:
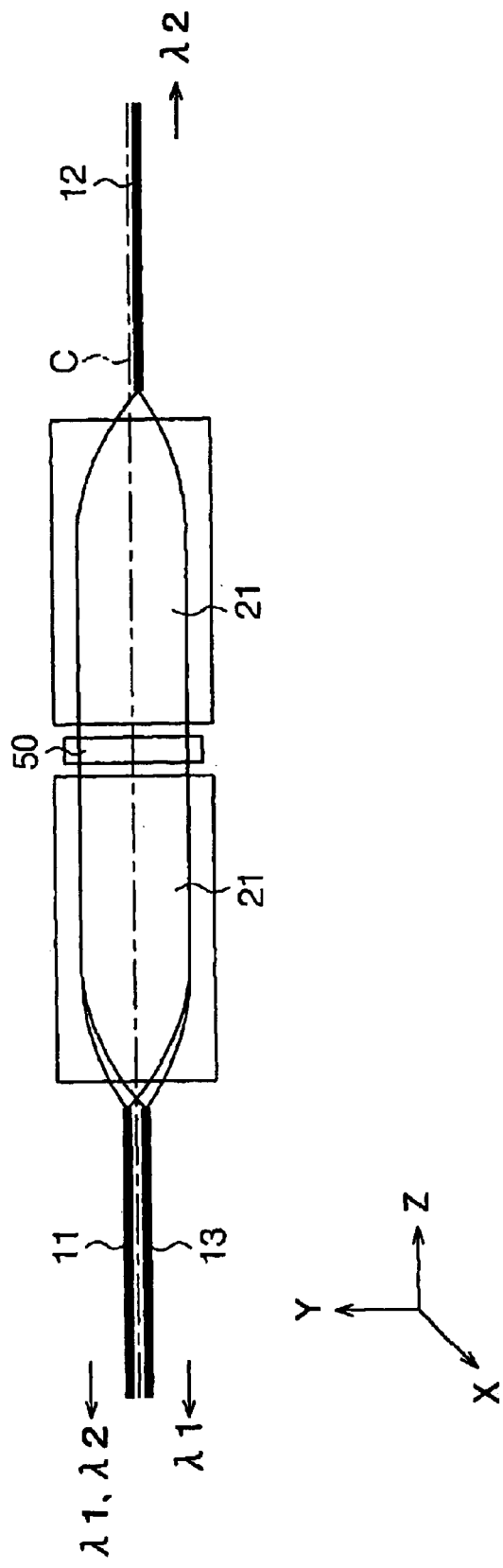
FIG. 5 shows a schematic constitutional view of the optical module according to the first embodiment of the present invention.

FIG. 5 shows an optical system where lenses 25, 26 in FIG. 4 are replaced by gradient index rod lenses 21, 22. A light having wavelengths λ1 and λ2 is emitted from an optical fiber 11 and enters the gradient index rod lens 21. A parallel light emitted from the lens 21 enters a spectral separation optical filter 50. The light having the wavelength 11 reflected by the optical filter 50 is converged by a lens 21 and enters an optical fiber 13. The light having the wavelength λ2 transmitted the optical filter 50 is converged by a second gradient index rod lens 22 and enters an optical fiber 12.

An arrangement of each optical component in using the gradient index rod lenses 21, 22 is basically the same as the case of FIG. 4. A focal distance of the gradient index rod lens is determined by means of a lens length Z. A meandering period (Pitch) P of a light beam in a lens is determined by means of a refractive index distribution, but a distance between an end face and a focal position of the lens changes according to the lens length based upon the period of P. For example, supposing Z=0.25 P, a focal plane is coincident with a position of the end face of a lens. If Z<0.25 P, the focal plane is positioned at the outside of the end face of the lens.

When the same arrangement as that in FIG. 4 by using a lens with a lens length Z=0.25 P is adopted, the optical fibers 11, 13 are arranged so that the end faces of the optical fibers 11, 13 and the end face of a first lens are arranged to contact, an optical fiber 12 and a second lens 22 are arranged so that the end face of the optical fiber 12 and an end face of the second lens 22 are arranged to contact. A lens length Z is preferably set a little shorter than 0.25 P in length in order to make a core adjustment easier for positioning the optical fiber.

Figure 6:
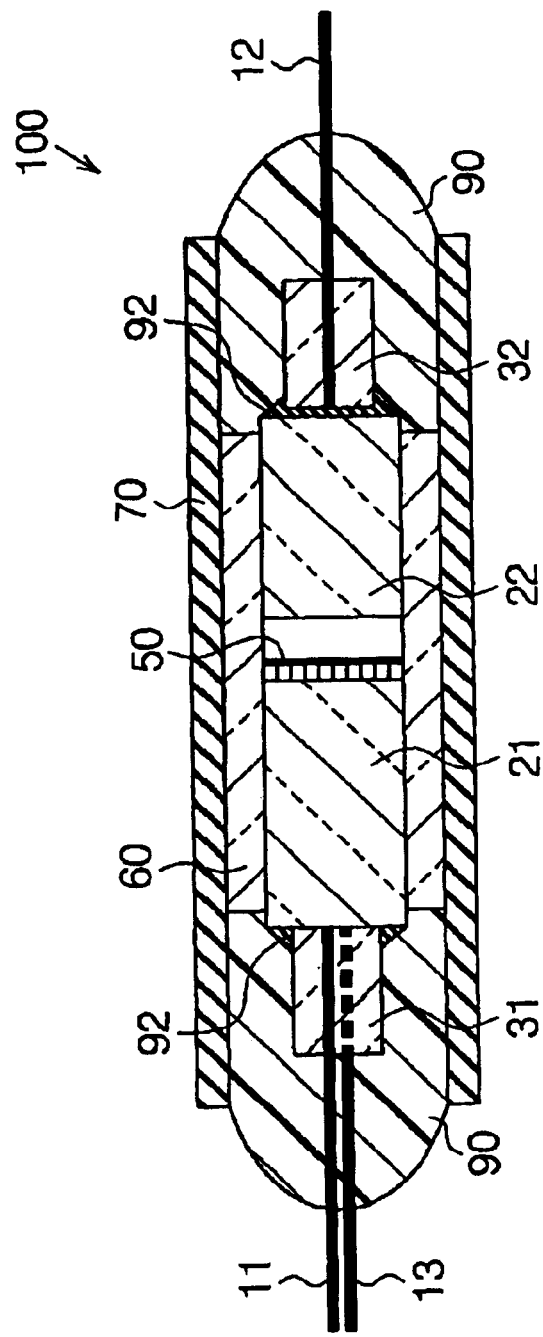
FIG. 6 shows a cross sectional view of the optical module in FIG. 5.

FIG. 6 shows a schematic cross sectional view of a light (filter) module 100 in accordance with the first embodiment of the present invention. The filter module 100 includes the optical system in FIG. 5.

In this case, a normal single mode optical fiber having a 125 μm clad diameter was used as the optical fiber and a lens having an outer diameter of 1.8 mm, $A^{1/2}=0.323$ mm$^{-1}$ and a lens length=0.23 P was used.

A capillary 31 for a double-core has an optical fiber insertion hole and is made of glass. The optical fiber insertion hole has a rectangle cross section so that two optical fibers having a diameter of 125 μm can be adjacently inserted therein. Therefore, a distance between the centers of cores of the optical fibers is approximately 125 μm. Two optical fibers are arranged to become substantially symmetric with respect to center of a lens when a light enters a lens 21 from one optical fiber, an outgoing light inclines approximately 1.8 degrees with reference to the optical axis C.

An optical filter 50 is formed by directly alternately depositing a dielectric multilayer film consisting of a blend containing $SiO_2$ and $Ta_2O_2$ as the main components on the lens 25. The multilayer films are formed so that, for example, λ1=1480 nm, λ2=1550 nm.

Next, an assembling process for an optical filter module 100 will be explained.

1. A lens 21 is inserted into a sleeve 60 from one end of the sleeve 60 so that a face forming an optical filter 50 is to be inside thereof and a lens 22 is inserted into another end of the sleeve 60. The sleeve 60 consists of a glass tube and an inside diameter is larger than an outer diameter of the lens by about 10 μm. The distance between the optical filter face and the end face of the lens 22 is adjusted to a predetermined value and both lenses 21, 22 are secured to the sleeve 60 by an adhesive.

2. The distal ends of optical fibers 11, 13 are inserted into a double-core glass capillary 31 beforehand and are secured by the adhesive, and then the end faces thereof are polished.

3. A light having a wavelength λ1=1480 nm is coupled with the optical fiber 11 and a core adjustment for positioning of the capillary 31 is performed in X, Y, and Z directions so that a reflected light from the optical filter 50 is sufficiently coupled with the optical fiber 13, and subsequently the capillary and the end face of the lens 21 are secured with the adhesive 92. A direction of the capillary 31 is maintained in order to be parallel to an optical axis C of the lens within a fixed tolerance during the core adjustment.

4. The distal end of optical fibers 12 is inserted into a single-core glass capillary 32 and is secured, and subsequently the end face of the capillary 32 is polished.

5. A light having a wavelength λ2=1550 nm, transmitted through the optical filter 50 enters from the optical fiber 11. A core adjustment for positioning of the capillary 32 is performed in X, Y, and Z directions so that a light amount coupled with the optical fiber 12 is larger than a predetermined value, then the capillary 32 is secured to the lens 22 with the adhesive 92. A core adjustment for positioning of the capillary 32 is performed so that the light amount coupled to the optical fiber 12 becomes maximum amount. A direction of the capillary 32 is maintained in order to be parallel to an optical axis C of the lens within a fixed tolerance during the core adjustment.

6. A sleeve 60 is inserted in a cylindrical metal housing 70.

7. The resin 90 is filled in a housing 70 including the capillaries 31, 32 and lenses 21, 22, and the sleeve 60 and the housing 70 are secured together.

Important points are shown below for assembly process of the first embodiment.

(1) Two lenses 21, 22 are secured with each other by means of the sleeve 60 beforehand. Therefore, the two lenses 21, 22 may be secured so that the optical axes coincide with each other within a certain dimensional tolerance.

(2) The first, the third optical fibers 11, 13 are secured by the double-core capillary 31. Therefore, the optical axes of two optical fibers are kept in parallel within a fixed tolerance and a distance between optical axes is kept in a certain tolerance. The core adjustments of the two optical fibers 11, 13 are performed not independently but concurrently because the core adjustment is performed while keeping this state.

(3) In a state where the optical axes of the optical fibers 11, 12, and 13 are all kept in parallel to the optical axis C of the lens within a fixed tolerance, the core adjustment is performed. Actually, the parallel state is kept with reference to the capillaries 31, 32.

According to (1) to (3) described above, the core adjustments between the lens 21 and the capillary 31 and between the lens 22 and the capillary 32 may be performed each other only in X, Y, and Z directions. An angle core adjustment around each axis such as an inclination of the lens 21, 22 to the optical axis C and the inclination of the lens and the optical fiber to the optical axis conventionally required becomes unnecessary. Thus, it becomes possible to largely shorten the core adjustment operation time.

The adhesive 92 having a refractive index 1.46 was used and a refractive index distribution coating that makes an optical reflection rate at wavelengths 1480 nm and 1550 nm to be equal or less than −40 dB was performed beforehand on the optical fiber side of the lenses 21, 22. Therefore, it is not necessary to perform an oblique cutting treatment for lens 21, 22 and the end face of the optical fiber. In addition, a manner for performing the oblique cutting treatment may be applied to the first embodiment.

Figure 7:
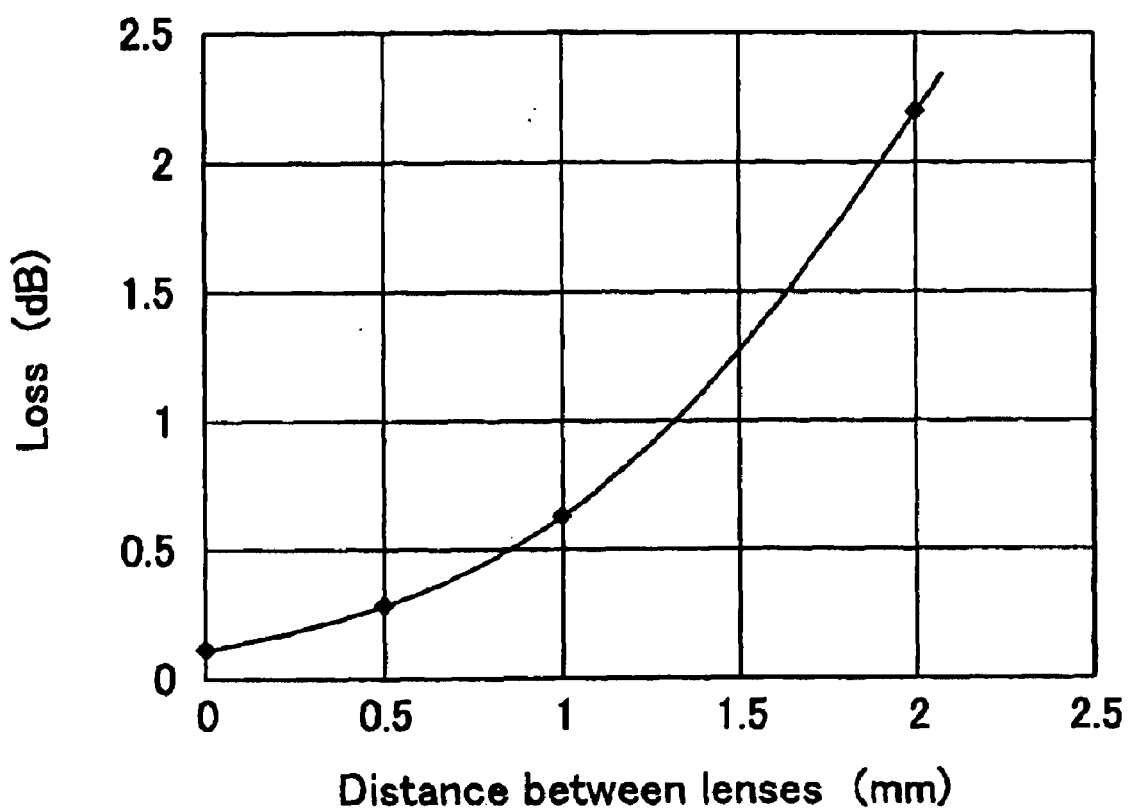
FIG. 7 is a graph showing a characteristic of the optical module in FIG. 5.

FIG. 7 shows a characteristic of a filter module 100. An optical loss of a light entering the optical fiber 12 was measured by varying a distance between the surface of the optical filter and the end face of the lens 22 (hereinafter the distance will be referred to as distance between lenses). A measurement result is shown in FIG. 7.

As shown in FIG. 7, when the distance between lenses exceeds 1 mm, the loss abruptly increases, whereas the loss is less than 1 dB when the distance is 1 mm or less, and is quite small.

The measurement result shows that a light almost in parallel to the center axis can be obtained from a position close to the center of an opposite end face of the lens 22 in order to obtain an outgoing light from the end face of the lens 22 closing to 1 mm or less, even if the light emitted from the lens 21 is obliquely emitted with respect to the center axis. Consequently, the distance between the end face of the lenses 21, 22 is preferably equal to or less than 1 mm. The shorter the distance between the end faces is, the better it is, and the distance of equal to or less than 0.5 mm is further preferred.

When dielectric multilayer films are directly deposited on the end face of the lens, a film thickness of dielectric multilayer films is substantially less than several micrometers. If another lens is brought into intimate contact with the multilayer film surface, the distance between lenses is estimated almost zero and the loss is significantly reduced.

The dielectric multilayer films may be formed on the other glass base or the like to insert the film between lenses without making the filter on the end face of the lens directly.

An optical device is not limited to a spectral separation optical filter. The present invention may be applied to the optical module by inserting various thin layer optical devices between collimators. For example, an optical device may be a bandpass optical filter transmitting a light having only a fixed wavelength region or a neutral density (ND) optical filter having a fixed transmittance throughout a wide wavelength region, and is not limited to the optical filter.

Figure 8:
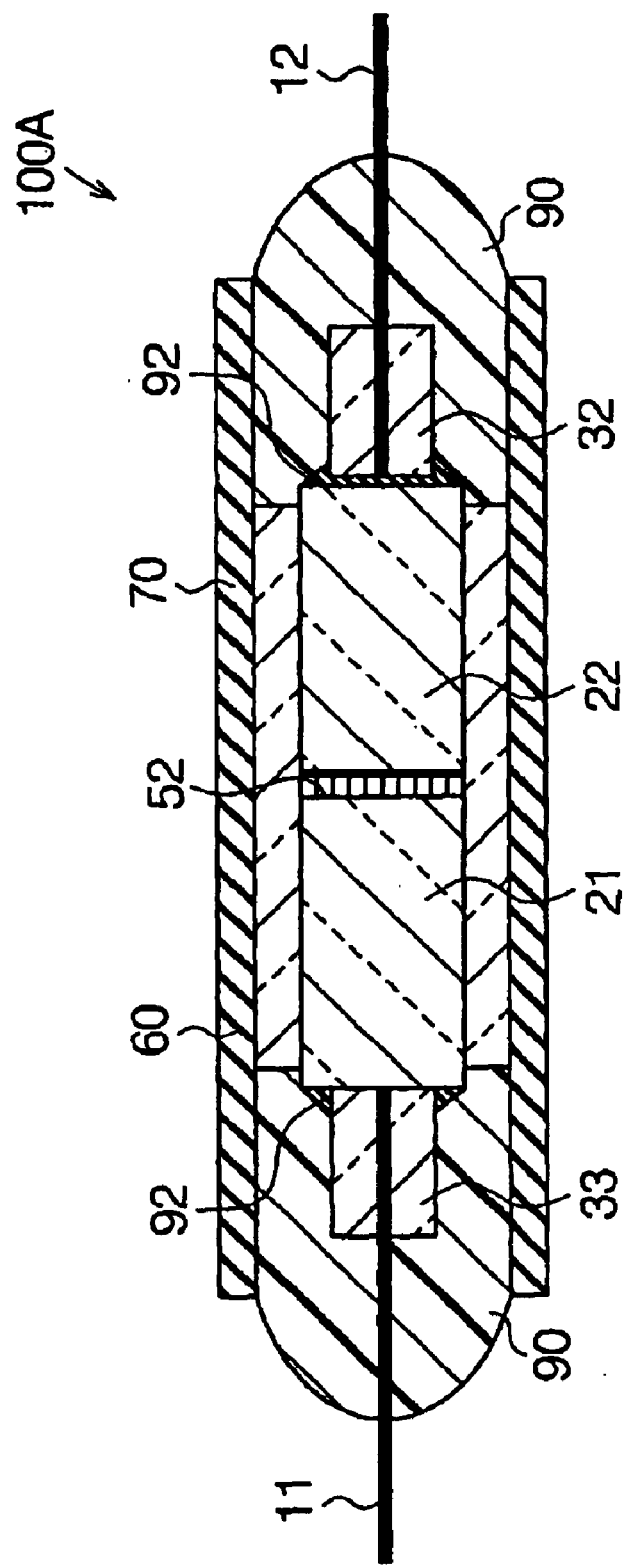
FIG. 8 is a cross sectional view of an optical module according to a second embodiment of the present invention.

FIG. 8 shows a schematic cross sectional view of a light (filter) module 100A in accordance with the second embodiment of the present invention. The optical filter module 100A of the second embodiment uses only a transmitted light.

In this case, a capillary 33 of an entering side may be for a single-core. A position of an optical fiber 11 for an incident light is adjusted to be on a center axis of the lens 21 and the displacement is within ±10 μm. Other assembly process is similar to that in the first embodiment. Various optical filters and, devices which have a function to a transmitted light may be used as a thin layer optical device 52. It is desirable that a thin film portion having a function of the thin layer optical device 52 be directly formed on a lens end face.

Figure 9:
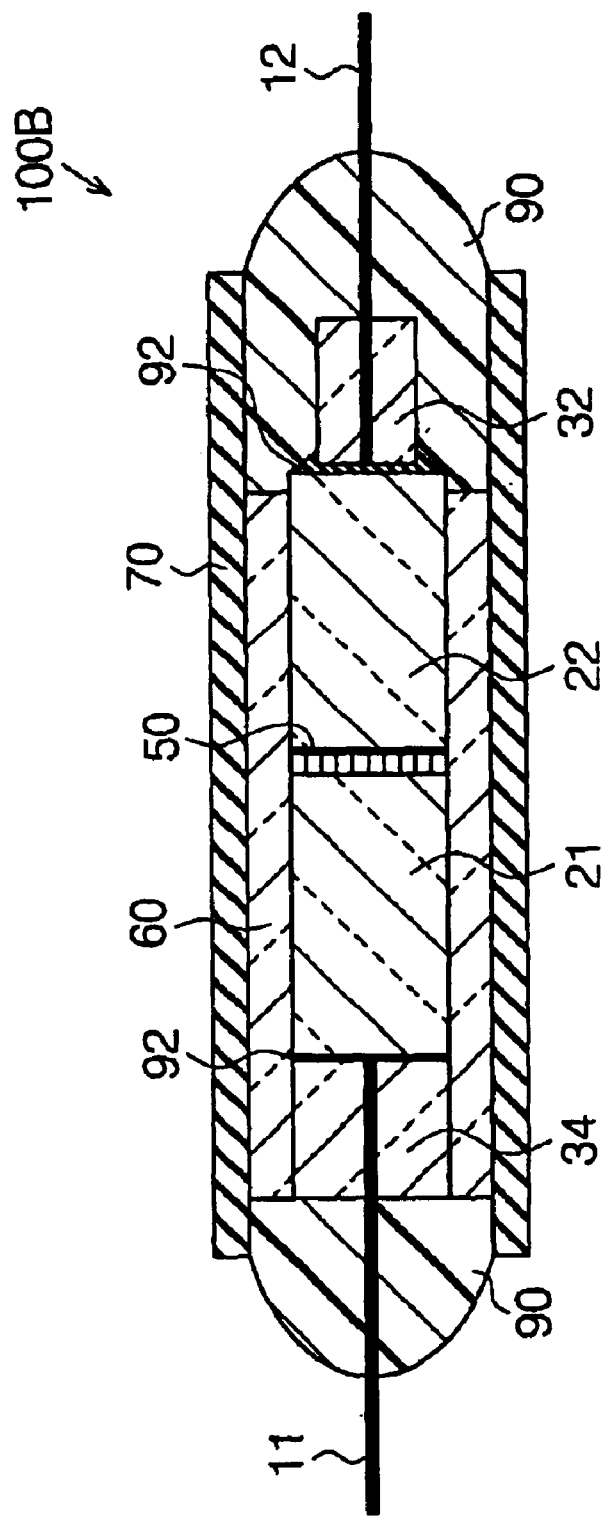
FIG. 9 shows a cross sectional view of an optical module according to a third embodiment of the present invention.

FIG. 9 shows a schematic cross sectional view of light (optical filter) module 100B in accordance with the third embodiment of the present invention. In an optical module 100B, an outside diameter of a capillary 34 to support an optical fiber 11 for an incident light is the same as that of a lens 21. Therefore, the optical module 100B has the same functionality as optical modules 100, 100A in the first and second embodiments, but the assembly procedure is simpler.

When adjusting a positional relationship of an optical fiber and a lens, if a periphery of a capillary is larger than a periphery of a lens, it is unfavorable for adhesion and the like, so that the outside diameter of the capillary is generally smaller than that of a lens. However, on the optical fiber side for an incident light where the positioning is performed only by a mechanical adjustment, the positioning is simply performed merely by inserting the lens and the capillary into a sleeve if the lens and the capillary have equivalent diameters. In the assembly process of the first embodiment, therefore, the positioning in process 3 becomes simple. That is, in the third embodiment, it is possible to keep optical axes of capillary 34 and lens 21 in parallel without using a special jig. It is not necessary that positioning accuracy of an optical fiber insertion hole of the capillary 34 is to be in a range of ±10 μm.

In the first to third embodiments, a lens of an optical filter module may be a spherical lens or an aspherical lens shown in FIG. 4 as far as it is a converging lens. However, it is preferable that a length of a lens be larger than the diameter thereof and the lens have a cylindrically treated face on a peripheral portion of the lens for simple securing with high accuracy. In this case, it is necessary for an optical axis of a lens to be parallel to a center axis of outer circumferential circular cylinder.

Figure 10:
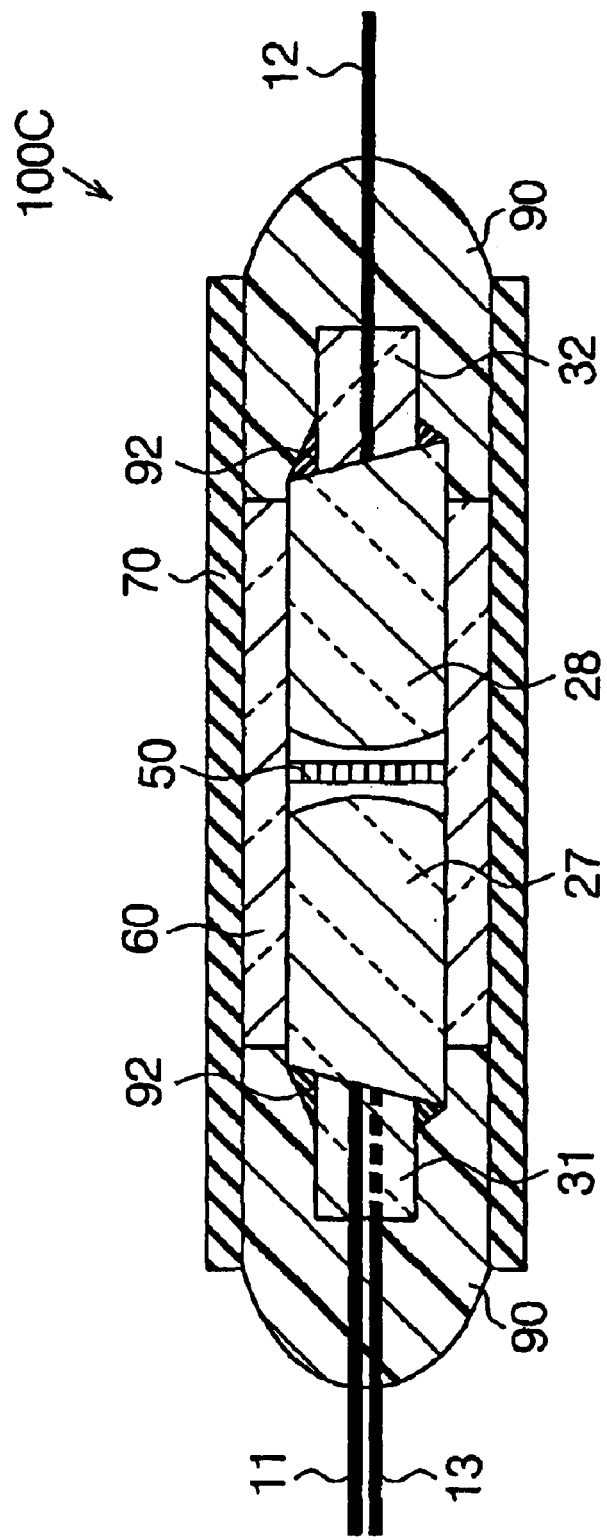
FIG. 10 shows a cross sectional view of another optical module according to the present invention.

As such a lens, there is a C lens made by Casix Co. Ltd., for example. A schematic cross sectional view of an outline of another optical filter module 100C using C lenses (cylindrical-shaped convex lens) 27, 28 made by Casix Co. Ltd. is shown in FIG. 10. A construction of lenses of an optical filter module 100C is different from that of optical filter modules 100, 100A, and 100B. The cylindrical-shaped convex lenses 27, 28 consist of cylinder-shaped homogeneous glass, whose one end face is treated to be a spherical surface. The other end face is plane, but an oblique cutting treatment is generally made thereon to prevent the reflection.

It is desirable to be seen through from the outside in order to adjust a distance between end faces of lenses 27, 28. It is desirable that a coefficient of the thermal expansion of the sleeve 60 be close to that of the lenses 27, 28. Therefore, the sleeve 60 is a glass tube. The sleeve 60 may be opaque when the lenses 27, 28 and an optical device 50 are used to mutually contact. The sleeve 60 may be a tube of metal and ceramics.

In the first to third embodiments, means for making axes of lenses 21, 22 coincide with each other and for securing them may be a groove having a cross section of a V shape, a U shape or a semicircle shape.

Figure 11:
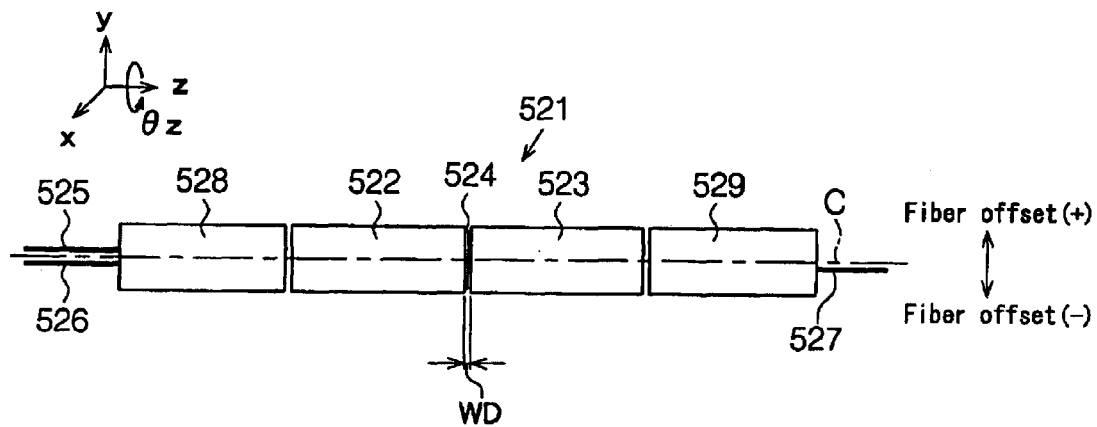
FIG. 11 shows a schematic constitutional view of the optical module according to a fourth embodiment of the present invention.

FIG. 11 shows a schematic constitutional view of a filter module 521 according to the fourth embodiment of the present invention. An optical filter module 521 includes an optical system which is substantially equivalent to the optical system shown in FIG. 3.

The optical filter module 521 includes a first lens 522 and a second lens 523, an optical filter (optical device) 524, a double-core fiber tip 528, and a single-core fiber tip 529.

In the double-core fiber tip 528, two optical fibers 525, 526 are secured thereto so that optical fiber axes become in parallel to each other and one optical fiber 527 is secured to the single-core fiber tip 529. Each of optical fibers 525, 526 is arranged on both sides of an optical axis C with the substantially same distance deviated from the optical axis in the opposite directions. The first lens 522 and the second lens 523 are gradient index rod lenses with a focal distance f. A distance between lenses is set at 2f and the optical filter 524 is formed on the end face of lens side of lens 522.

The first lens 522 and the second lens 523 comprise gradient index rod lenses (flat lens), both end faces of which are flatness surfaces perpendicular to an optical axis C respectively. The optical filter 524 is formed at the end face of the first lens 522 opposed to the second lens 523 (lens side end face). The optical filter 524 transmits a light having a certain wavelength region and is a wavelength selection film having characteristic to reflect a light having a wavelength region different from the certain wavelength region.

Two optical fibers 525, 526 are arranged in symmetric positions with respect to an optical axis C. That is, the optical fiber 525 is offset in the plus side (upper part in FIG. 11) by a predetermined amount with respect to the optical axis C (optical fiber offset (+)) and the optical fiber 526 is offset by the same amount as that of the optical fiber 525 in a minus side (lower part in FIG. 11) with respect the optical axis C [optical fiber offset (−)]. On the other hand, the optical fiber 527 is offset in the same direction and by the same amount as that of the optical fiber 526 with respect to the optical axis C. In addition, in the following discussion, the optical fiber 525 on an incident port side is called a first optical fiber, the optical fiber 526 on a reflection port side is called a second optical fiber and the optical fiber 527 in a transmitting port side is called a third optical fiber. In addition, an "incident port side" designates a channel side where a light enters, a "reflection port side" designates a channel side where a light reflected by the optical filter 524 enters and a "transmitting port side" designates a channel side where a light transmitted through the optical filter 524 enters.

As the first lens 522 and the second lens 523, the same gradient index rod lens is used. In this example, as lenses 522, 523, the gradient index rod lens is used wherein a lens diameter is 1.8 mm, a lens length 0.23 pitch and a focal distance f is 1.95 mm.

For each of optical fibers 525 to 527, a normal single mode optical fiber having an outside diameter of 125 $\mu$m is used. Consequently, when the optical fibers 525, 526 is held by the double-core fiber tip 528 so as to contact with each other in a symmetric position with respect to the optical axis C, an offset amount of the optical fiber 527 is about 60 $\mu$m or more.

When the optical filter module 521 emits a light having a wavelength region which transmits through the optical filter 524 from the first optical fiber 525, the light is collimated by the first lens 522, transmits through the optical filter 524, consequently the transmitted light is converged by the second lens 523, and then enters the third optical fiber 527. When the optical filter module 521 emits a light having a wavelength region which is reflected by the optical filter 524 from the first optical fiber 525, the emitted light is collimated by the first lens 522 and is reflected by the optical filter 524, consequently the reflected light is converged by the first lens 522, and then enters the second optical fiber 526. The optical filter module 521 is configured as a spectral separation module having 3-ports (an incident port, a reflection port and a transmitting port) used for an optical communication system such as a wavelength division multiplex (WDM) or a high density wavelength-multiplex (DWDM) transmission system.

Figure 12:
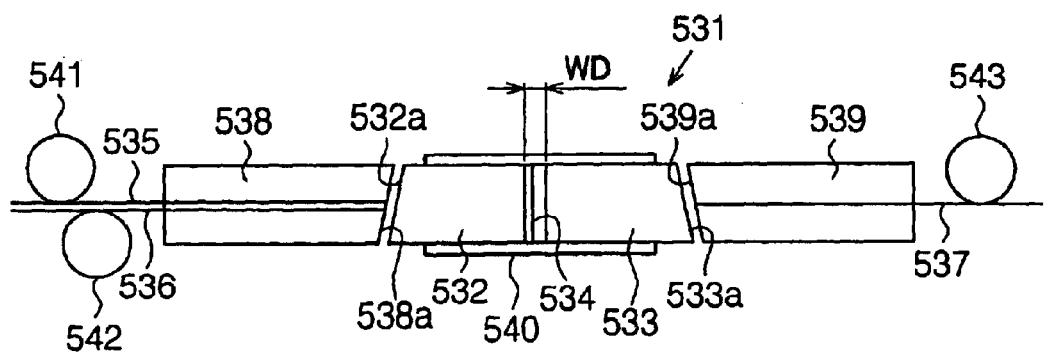
FIG. 12 shows a schematic constitutional view of another optical module according to the fourth embodiment of the present invention.

FIG. 12 shows a schematic cross sectional view of another light (filter) module 531 in accordance with the fourth embodiment of the present invention.

The filter module 531 comprises a first lens 532 and a second lens 533, an optical filter 534 (optical device), a double-core fiber tip 538, and a single-core fiber tip 539.

The double-core fiber tip 538 holds two optical fibers 535, 536 and the single-core fiber tip 539 holds one optical fiber 537.

The first lens 532 is a gradient index rod lens. The end face which oppose the second lens 533 (lens side end face) is perpendicularly polished to the optical axis C into a flat plane and an end face 532a which opposes the optical fibers 535, 536 (end face on the optical fiber side) is polished into an oblique plane having a predetermined angle of inclination with respect to the optical axis C.

The optical filter 534 is formed on the end face of the lens side of the first lens 532. The optical filter 534 is a wavelength selection film similar to the optical filter 524.

The second lens 533 is a gradient index rod lens. The end face of the opposing side to the first lens 532 (the end face on the lens side) is flat plane, and an end face 533a which opposes the optical fiber 537 is an oblique plane having a predetermined angle of inclination with respect to the optical axis C.

The first lens 532 and the second lens 533 are inserted in a cylindrical glass tube 540 and are positioned in a predetermined position. Then, they are secured to a glass tube 540.

The end face of lens side 538a of a double-core fiber tip 538 is formed into an oblique plane which is the same as the end face of the optical fiber side 532a of the first lens 532. The end face of the lens side 539a of a single-core fiber tip 539 is formed into an oblique plane which is the same as the end face on the optical fiber side 533a of the second lens 533 as well.

In the optical filter module 531, two optical fibers 535, 536 are arranged in substantially symmetric positions with respect to the optical axis C, and the optical fiber 537 is arranged so that a displacement of the second lens 533 with respect to the optical axis C is equal to that of the first lens 532 of the optical fiber 536 with reference to the optical axis C. Note that in the following discussion, the optical fiber 535 on an incident port side is called a first optical fiber, the optical fiber 536 on a reflection port side is called a second optical fiber, and the optical fiber 537 on a transmitting port side is called a third optical fiber.

[One Embodiment]

One embodiment of the present invention applied to an optical filter module 521, 531 described above will be described below.

An assembly tolerance which is mainly set to make an optical filter module 521 among these optical filter modules 521, 531 (Conditions 1 to 7) is described now. Be noted that Conditions 1 to 7 are set to restrain loss tolerance of the optical filter module 521 to be equal to or less than approximately 0.4 dB by an absolute value. Considering 0.2 dB loss caused by a lens aberration, in particular, the condition is set to restrain insertion loss on a reflection side and a transmitting side to be equal to or less than approximately 0.2 dB.

(Condition 1) Supposing a focal distance of a first lens 522 and a second lens 523 is f, a displacement amount of an optical filter 524 from a focal position of the first lens 522 (focal position of the first lens) is set within approximately ±25% of the focal distance f. In other words, the distance from the first lens 522 of optical filter 524 is set within a range of about (f−f/4)−(f+f/4).

Figure 13:
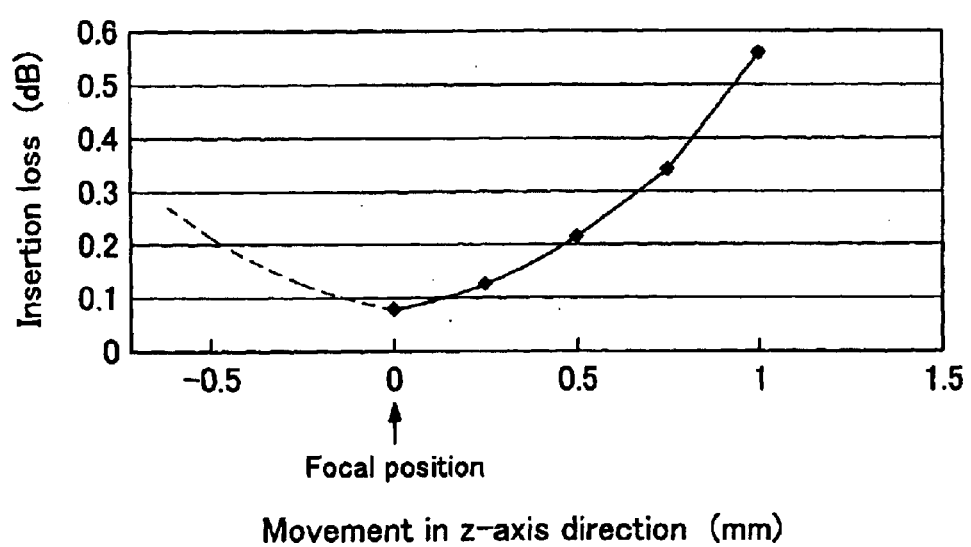
FIG. 13 is a graph showing a relationship between a displacement of the optical filter and an insertion loss.

FIG. 13 shows an experiment result and a relationship between a displacement amount of the optical filter 524 from the focal position of the first lens 522 and insertion loss. According to the experiment result in FIG. 13, it is found that when the optical filter is moved to +side by approximately 0.5 mm (roughly 25% of the focal distance f) from the focal position of the first lens 522, insertion loss increases by approximately 0.1 dB and reaches 0.2 dB.

In FIG. 13, "0" on a horizontal scale representing the displacement amount of the optical filter 524 in a Z direction (a movement in the Z direction) indicates the focal position of the first lens 522 spaced-apart by only the focal distance f from the end face of lens side of the first lens 522. The experiment result shown in FIG. 13 shows a data in the case where lens diameters of the first lens 522 and the second lens 523 are both 1.8 mm, the lens lengths are both 0.23 pitch, and the focal distances are both 1.97 mm. Insertion loss as shown in the vertical scale of FIG. 13 is "insertion loss on the reflection side". That is, it is insertion loss wherein a light emitted from the first optical fiber 525 is reflected by the optical filter 524 and then enters the second optical fiber 526.

(Condition 2) Vertical oblique angle θx and horizontal oblique angle θy of each first, second and the third optical fibers 525, 526 and 527 with respect to the optical axis (Z-axis) of the first lens is set within less than 0.2 degrees.

Figure 14:
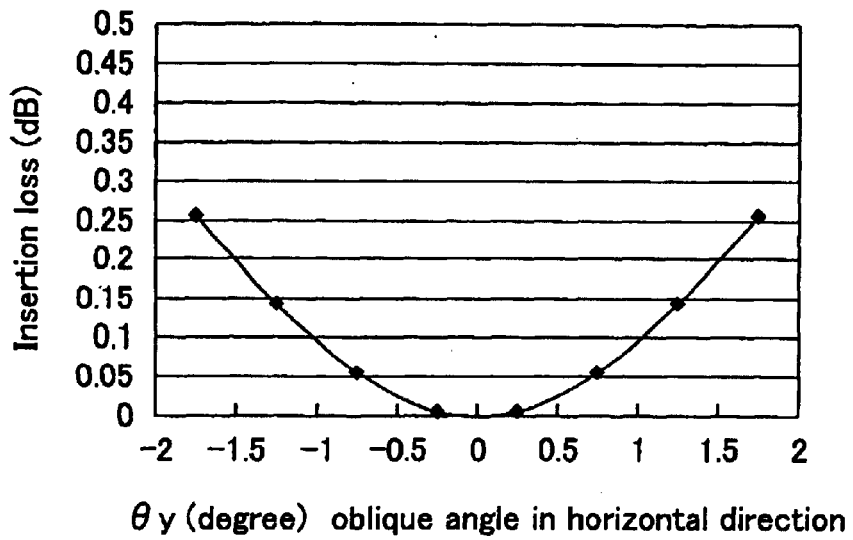
FIG. 14 is a graph showing a relationship between a horizontal oblique angle θy and an insertion loss.

From the experiment result shown in FIG. 14, if an oblique angle θy (degree) in the Y-axis direction of each of optical fibers 525, 526, 527 with respect to the optical axis (Z-axis) of the first lens 522 is within 1.5 degrees, it is estimated that there is no large amount of insertion loss. If an oblique angle θx of each of optical fibers 525, 526, 527 is within 1.5 degrees, it is estimated that there is no large amount of insertion loss. Considering other accumulated tolerance, it is found that oblique angles θx, θy in the vertical, horizontal directions of each of optical fibers 525, 526, 527 with respect to the optical axis must be set within 0.2 degrees respectively.

(Condition 3) The distance between the first lens 522 and the second lens 523 is determined to be within about 2f±(25% of 2f), i.e., within a range of about 2f±2f/4.

An optical fiber diameter of each of optical fibers 525 to 527 is normally 125 μm. When making the double core fiber tip 528 hold the optical fibers 525, 526 so as to contact with each other in a symmetric position with respect to the optical axis C, an offset amount of the optical fiber 527 is approximately 60 μm (in this example −60 μm). When the offset amount is approximately 60 μm, it is found that insertion loss increases by approximately 0.2 dB, if the distance between lenses (WD) is displaced by approximately 1 mm (approximately 25% of 2f) according to the experiment result shown in FIG. 15 and FIG. 16. Be noted that the offset amount of the optical fiber 527 is shown in four cases of −60 μm, −70 μm, −80 μm and −100 μm in FIG. 16, and insertion loss for each case is shown by raising by approximately 0.10 dB from the actual value.

(Condition 4) A displacement of the optical axis C of the first lens 522 and the optical axis C of the second lens 523 is set within 2.5% of the focal distance f.

Insertion loss is estimated by the experiment result shown in FIG. 14 with regard to the relationship of a displacement of the optical axes of the lenses 522, 523 and the beam inclination, and each oblique angle θx, θy of each of optical fibers 525 to 527. As a result, when the focal distance f of both lenses 522, 523 is set 1.95 mm, an estimation wherein the displacement of the optical axis is within 50 μm is obtained. That is, the estimation to set the displacement of the optical axis of lenses 522, 523 to be within 2.5% of the focal distance f is obtained.

(Condition 5) A relative rotation oblique angle θz wherein a rotation axis is a Z-axis (optical axis) of the first and the second lenses is set within 20 degrees.

Note that this Condition 5 is applied, as an optical filter module 531 shown in FIG. 12, only to the case where a gradient index rod lens formed with oblique planes 532a, 533a thereon to prevent a reflected return light is used as the first and second lenses 532, 533. It is not applied to the optical filter modules 511, 521 shown in FIG. 11.

(Condition 6) The inclination of the first lens 522 and the second lens 523 with respect to the optical axis C is set within 1.5 degrees respectively.

From the experiment result shown in FIG. 14 of the relationship between the inclination of the end face of lens side of lenses 522, 523 and the beam, and the inclination in each X, Y-axis direction of each of optical fibers 525 to 527, an estimation that the inclination of the end face of lens side of lenses 522, 523 with respect to the optical axis C is set to be within 1.5 degrees respectively is obtained by assuming the inclination and insertion loss.

(Condition 7) An inclination error in an X-axis direction and an inclination error in a Y-axis of each lens side end face of the first lens 522 and the second lens 523 with respect to the optical axis C are set within 10 degrees respectively (Refer to FIG. 17). Further, an inclination error in the X-axis direction and an inclination error in the Y-axis of the end face of each optical fiber side of the first lens 522 and the second lens 523 with respect to the optical axis C are set within 2.5 degrees respectively (Refer to FIG. 17).

The above-mentioned Conditions 1 to 7 are shown in FIG. 17.

When the optical filter module 531 shown in FIG. 12 is assembled, the assembly tolerance (Conditions 1 to 7) is set in the same manner as that for assembling the optical filter module 521. Assembly steps of the optical filter module 531 to satisfy the Conditions 1 to 7 will be now described. The assembly process includes the following processes 1 to 3. The double-core fiber tip 528 and the single-core fiber tip 529 are assembled beforehand.

(Process 1) The first lens 532 and the second lens 533 are inserted in the glass tube 540 and are temporarily secured.

(Process 2) By emitting a light having a wavelength region reflected by the optical filter 534 from the first optical fiber 535 in the incident port side, and monitoring the reflection light entering the second optical fiber 536 in the reflection port side reflected by the optical filter 534, the core adjustment for the double-core fiber tip 538 is performed in X, Y, Z directions so that a light amount of the reflection light becomes maximum amount. After this core adjustment, the double-core fiber tip 538 is secured to the first lens 532. The Process 2 may be carried out before the process 1.

(Process 3) By emitting a light having a wavelength transmitting the optical filter 534 from the first optical fiber 535, and monitoring the transmitted light entering the third optical fiber 537 in the transmitting port side, the core adjustment for the single-core fiber tip 539 is performed in X, Y, Z directions so that a light amount of the transmitted light becomes maximum. After the core adjustment of the single-core fiber tip 539, the single-core fiber tip 539 is secured to the second lens 523.

Core adjustment accuracy in X, Y, Z directions in the process 2 and process 3 requires 0.5 μm or less, but the accuracy is possible enough to be achieved by the present art. Further, each of the process 2 and the process 3 is equivalent to the core adjustment operations (a) and (b). Furthermore, the coincidence operation between a mode field diameter and a beam waist diameter of the optical fiber in the reflection side is automatically performed by process 2. Similarly, the coincidence operation between a mode field diameter and a beam waist diameter in the transmitting side is automatically performed by process 3 as well.

By the process 1 to process 3, the assembly of optical filter module 531 is completed, but even if the core adjustment operation (c) and (d) among four core adjustment operations (a) to (d) are omitted, the optical filter module 531 satisfies all the Conditions 1 to 7 and the required insertion loss is obtained. Furthermore, the core adjustment operation (b) is automatically performed when the core adjustment operation (a) is performed.

Examples and Comparative examples will be explained below by referring to Table in FIG. 17.

Be noted that each data in FIG. 17 represents the data wherein the gradient index rod lens having a refractive index distribution constant $A^{1/2}$ of 0.322 is used.

EXAMPLE 1

Two gradient index rod lenses having a lens length of 0.25 pitches (focal distance f is 1.95 mm) was used. The end face on the optical fiber side for each lens is polished into oblique plane with 8 degrees as shown in FIG. 12. Allowance accuracy of the Condition 1 (displacement from the focal position of the optical filter) was set in less than 0.07 mm, namely less than 3.5% of the focal distance f. Allowance accuracy of the Condition 3 (displacement from lens spacing 2f) was set at 0.5 mm, that is, the distance between lenses (WD) of the lenses 522, 523 was set at 2f±(13% of 2f). Other allowance accuracy was the same as Example 2.

Figure 15:
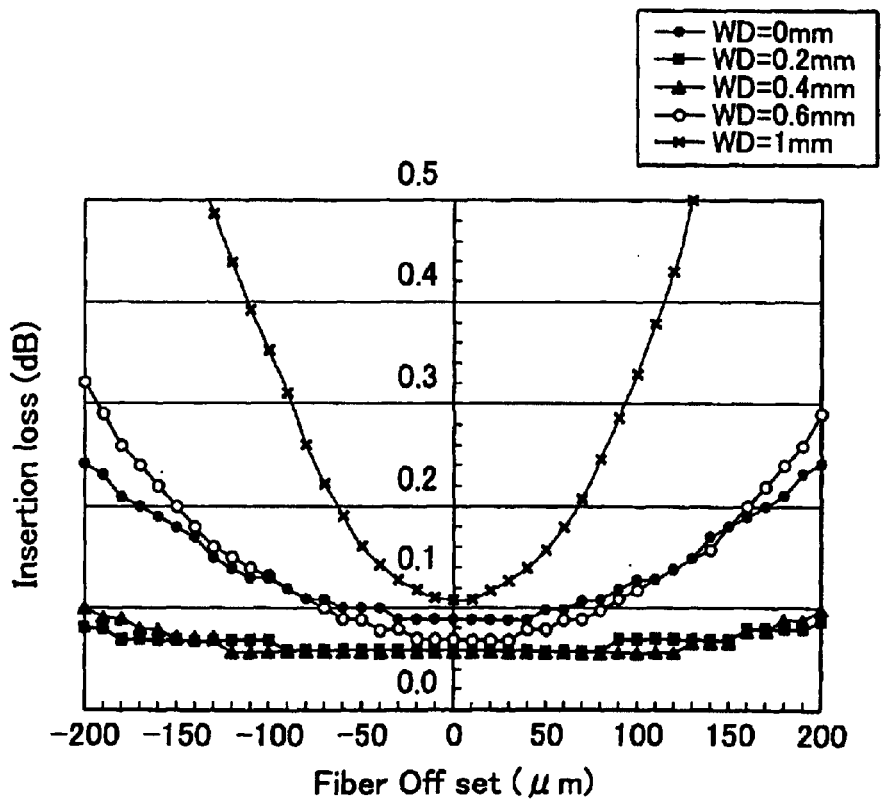
FIG. 15 is a graph showing a relationship between an offset amount of an optical fiber and an insertion loss.
Figure 16:
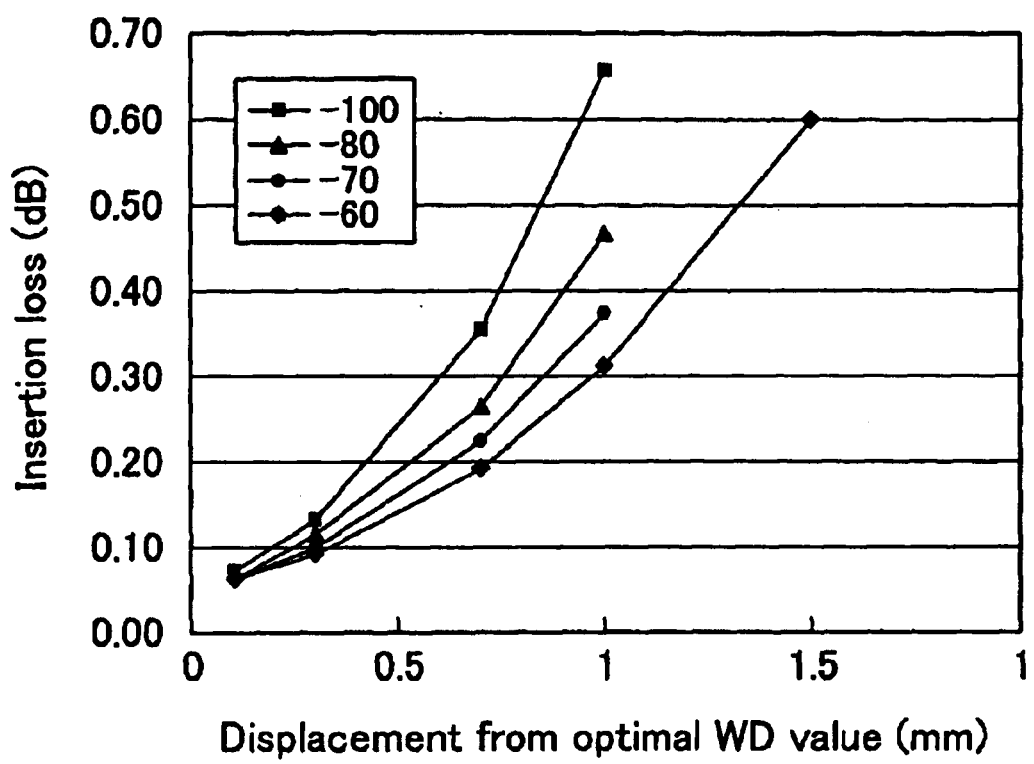
FIG. 16 is a graph showing a relationship of a displacement amount of a distance between lenses WD and an insertion loss.

In Example 1, allowance accuracy of each Condition was set as shown in FIGS. 17 and 15 optical filter modules were assembled. Reflection side loss and transmitting side loss were measured regarding each optical filter module and average, standard deviation and the worst-case value of 15 PCS samples were calculated for each loss. Data of each loss is shown in FIG. 17.

EXAMPLE 2

Two gradient index rod lenses having the lens length of 0.23 pitch (focal distance f=1.97 mm) were used. The end face on the optical fiber side for each lens was polished into oblique plane with 8 degrees as shown in FIG. 12. In Example 2, allowance accuracy of the Condition 1 was set in 0.25 mm, namely 13% of the focal distance f. Allowance accuracy of Condition 3 was set at 0 mm, namely the distance between lenses was set at 2f. One optical filter module was assembled in Example 2, data of each loss of one optical filter module is shown in FIG. 17.

EXAMPLE 3

Two gradient index rod lenses having the lens length 0.24 pitch (focal distance f=1.96 mm) were used. Each lens was a flat lens, both end faces of which were polished into a flat plane perpendicular with respect to the optical axis C as shown in FIG. 11. Allowance accuracy of the Condition 1 was set in 0.5 mm, namely 25% of the focal distance f. Allowance accuracy of Condition 3 is set at 1 mm, namely the distance between lenses (WD) was set to be 2f±(25% of 2f). Allowance accuracy of Condition 5 (relative rotation oblique angle θz of each lens) was 0 since the flat lens was used. Other allowance accuracy was the same as Examples 1 and 2. Allowance accuracy of each Condition was set as shown in FIG. 17. One optical filter module was assembled in Example 3, data of each loss of one optical filter module is shown in FIG. 17.

COMPARATIVE EXAMPLE 1

Two gradient index rod lenses having the lens length of 1.25 pitch (focal distance f=95 mm) was used. The end face of the optical fiber side for each lens was polished into a degrees oblique plane with 8 degrees as shown in FIG. 12. Allowance accuracy of an Condition 1 was 0.07 mm and was set in 3.5% of the focal distance f. Allowance accuracy of Condition 3 was 0.5 mm and the distance between lenses (WD) was set to be 2f±(13% of 2f). Allowance accuracy of Condition 2 (oblique angles of the first, the second optical fiber θx, θy, oblique angles of the third optical fiber θx, θy) was set in 0.5 degrees which is larger than that of Examples 1 to 3 respectively. Other allowance accuracy was the same as Examples 1 and 2.

In Comparative example 1, allowance accuracy of each Condition was set as shown in FIGS. 17 and 13 optical filter modules were assembled. Reflection side loss and transmitting side loss were measured regarding each optical filter module and average, standard deviation and the worst-case value of 13 PCS samples were calculated for each loss.

COMPARATIVE EXAMPLE 2

Two gradient index rod lenses having the lens length of 0.24 pitch (focal distance f=1.96 mm) were used. Each lens uses a flat lens which is the same as that used in Example 3. Allowance accuracy of Condition 1 was 0.16 mm and set in 8% of the focal distance f. Allowance accuracy of Condition 3 was 1.5 mm and the distance between lenses (WD) was set at 2f±(39% of 2f). Allowance accuracy of Condition 5 (relative rotation oblique angle θz of a lens) was set at zero. Other allowance accuracy was the same as that in Examples 1 to 3. Allowance accuracy of each Condition was set as shown in FIG. 17 and one optical filter module was assembled.

(Consideration)

When comparing Example 1 with Example 2, the reflection side loss of Example 1 is smaller than that of Example 2, because the allowance accuracy in the Condition 1 of Example 1 is set severer than that of Example 2, the transmitting side loss of the example 2 is smaller than that of Example 1 because the allowance accuracy in Condition 3 of Example 2 is set severer than that of Example 1.

When comparing Example 2 with Example 3, both reflection side loss and transmitting the side loss of Example 2 is smaller than that of Example 3, because the allowance accuracy in the Conditions 1 and 3 of Example 2 is set severer than that of Example 3.

From the above, allowance accuracy of the Condition 1 contributes greatly to improvement in reflection side loss and it is found that allowance accuracy of the Condition 2 contributes greatly to improvement of transmitting side loss.

This is applicable to a case where each of Examples 1 to 3 is compared with Comparative example 2.

When comparing Example 1 with Comparative example 1, both reflection side loss and transmitting the side loss of Example 1 is much smaller than that of Comparative example, because the allowance accuracy in the Condition 2 of Example 1 is set severer than that of Comparative example 1. Regarding dispersion of each loss and the worst-case value, Example 1 is much preferable than Comparative example 1.

The fourth embodiment has the following advantages.

(1) By means of a displacement amount of the optical filter 524 from the focal position of the first lens 522 being set within ±25% of the focal distance f, increase of insertion loss in the reflection side can be suppressed to approximately 0.2 dB or less. By means of the assembly tolerances of optical filter 524 with respect to the first lens 522 (allowance accuracy of Condition 1) being set, the optical filter module whose insertion loss is smaller than the predetermined value can be assembled without an adjustment of oblique angles θx, θy of the optical fibers. Consequently, productivity is improved and a manufacturing cost can be reduced.

(2) By means of an oblique angle θx in the perpendicular direction and an oblique angle θy in the horizontal direction of optical fibers 525, 526 arranged in the incident side of the first lens 522 with respect to the optical axis C of the first lens 522 being set within 0.2 degrees respectively, insertion loss in the reflection side can be suppressed to a predetermined value or less. Therefore, the optical filter module 521 satisfying required increase of insertion loss (e.g. ≦0.2 dB) in the reflection side can be assembled without adjusting oblique angles θx, θy of optical fibers 525, 526. Consequently, productivity is improved and a manufacturing cost can be reduced.

(3) By means of an oblique angle θx and an oblique angle θy of optical fibers 527 arranged in the outgoing side of the first lens 523 with respect to the optical axis C of the first lens 523 being set within 0.2 degrees respectively, insertion loss in the transmitting side can be suppressed to a predetermined value or less. Therefore, the optical filter module satisfying required increase of insertion loss (e.g. ≦0.2 dB) in the transmitting side can be assembled without adjusting oblique angles θx, θy of optical fibers 527. Consequently, productivity is improved and a manufacturing cost can be reduced.

(4) By means of an oblique angle θx of optical fibers 525, 526 arranged in the incident side of the first lens 522 and an oblique angle θy of the optical fiber 527 arranged in the outgoing side of the second lens 523 being set within 0.2 degrees respectively, insertion loss can be suppressed to a predetermined value or less. To make such settings is a necessary condition in order to assemble the optical filter module 521 satisfying both required increase of insertion losses (e.g. ≦0.2 dB) in the reflection side and the transmitting side without adjusting oblique angles θx, θy of optical fibers 525–527. By satisfying these Conditions, productivity is improved and a manufacturing cost can be reduced.

(5) By the distance between lenses (WD) of the first lens 522 and the second lens 523 being set within 2f±(25% of 2f), namely, by satisfying above Condition 3, the increase of the loss in the transmitting side due to the displacement between lenses can be suppressed. To make such settings that the distance between lenses (WD) is to be within 2f±(25% of 2f) is a necessary condition in order to assemble the filter module satisfying the required increase of insertion loss (e.g. ≦0.2 dB) in the transmitting side without adjusting oblique angles θx, θy of the optical fiber. Consequently, productivity is improved and a manufacturing cost can be reduced.

(6) By the displacement of the optical axis between the axis of the third lens 522 and the axis of the second lens 523 being set within 2.5% of the focal distance f, namely, by satisfying above Condition 4, the increase of the loss in the transmitting side due to the displacement between axes of both lenses 522, 523 can be suppressed. Consequently, an optical filter module having smaller insertion loss is provided. In addition, to set the displacement of the axes of both lenses 522, 523 to be within 2.5% of the focal distance like this is a necessary condition in order to assemble the optical filter module satisfying the required increase of insertion loss (e.g. ≦0.2 dB) in the transmitting side without adjusting oblique angles θx, θy of the optical fiber. Consequently, productivity is improved and a manufacturing cost can be reduced.

(7) Condition 5, as shown by the filter module 531 in FIG. 12, is applied to a lens where the first lens and the second lens have an oblique plane with respect to the optical axis respectively and either of the incident plans and the outgoing plane is a flat plain. In the case of the filter module 531, the end face on the optical fiber side (receiving surface) 532a of the first lens 532 and the end face on the optical fiber side (emitting surface) 533a of the second lens 533 are oblique planes respectively. In the filter module 531, by the rotation oblique angle θz of both lenses 532, 533, particularly, the rotation oblique angle θz of the end faces on the optical fibers 532a, 533a being set within 20 degrees, insertion loss in the transmitting side can be reduced by preventing a reflection return light. In the optical filter module 531, to set the rotation oblique angle θz of the end face on the optical fibers 532a, 533a within 20 degrees is a necessary condition to assemble the filter module without adjusting the oblique angles θx, θy of the optical fiber. Consequently, productivity is improved and a manufacturing cost can be reduced.

(8) By satisfying Conditions 1 to 7, the required insertion loss can be obtained even if the core adjustment operation (c) and (d) among four core adjustment operations (a)–(d) are omitted. However, Condition 5 is, as in the case of the filter module 531, is applied to a lens where the first lens and the second lens, either of the incident plans and the outgoing plane of which is a flat plain, have an oblique plane with respect to the optical axis respectively. Accordingly, the filter module assembly time is shortened and a manufacturing cost can be reduced since the number of core adjustment points and the frequency of the core adjustment operation is decreased. Incidentally, the core adjustment operation (b) is automatically performed when the core adjustment operation (a) is performed.

(9) By setting a vertical oblique angle and a horizontal oblique angle of each lens side end face of the first lens 522 and the second lens 523 with respect to the optical axis within 10 degrees, insertion loss can be suppressed to 0.2 dB or less (Refer to FIG. 17).

(10) By setting a vertical oblique angle and a horizontal oblique angle of each optical fiber side end face of the first lens 522 and the second lens 523 with respect to the optical axis within 2.5 degrees, insertion loss can be suppressed to 0.2 dB or less (Refer to FIG. 17).

It should be apparent to those skilled in the art that the present invention may be embodied in many other specific forms without departing from the spirit or scope of the invention. Particularly, it should be understood that the invention may be embodied in the following forms.

The fourth embodiment can be carried out by modifications described as follows.

The assembly tolerance (Conditions 1 to 7) can be set when making optical filter modules 100, 100A, 100B, 100C, and 511.

Filter modules 511,521,531 may be a combined wave modules. In this case, it is configured that a light having different wavelengths sent from at least two optical fibers enters one optical fiber via the first lens and the second lens.

The application of the assembly tolerance (Conditions 1 to 7) is not limited to a 3-port optical filter module. The assembly tolerance (Conditions 1 to 7) can be applied to a filter module, for example, having at least three optical fibers in the incident side of the first lens and at least two optical fibers in the outgoing side of the second lens.

Condition 5 can be set in the other lens aside from the rod lens. For example, the Condition 5 can be set in the case where a spherical lens of flat convexity is polished into an oblique plane and the end face of a flat plate-shaped microlens is polished into oblique plane.

Therefore, the present examples and embodiments are to be considered as illustrative and not restrictive and the invention is not to be limited to the details given herein, but may be modified within the scope and equivalence of the appended claims.

What is claimed is:

1. An optical module, comprising:
   a first optical fiber;
   a first lens, optically coupled with the first optical fiber, for receiving an incident light from the first optical fiber and converting the incident light into a parallel light;
   an optical device for receiving the parallel light and performing predetermined optical processing on the parallel light;
   a second lens for receiving a transmitted parallel light from the optical device and converging the transmitted parallel light to produce an outgoing light;
   a second optical fiber, optically coupled with the second lens, for receiving the outgoing light;
   wherein an optical axis of the first lens and an optical axis of the second lens are substantially coincident with each other, and
   an optical axis of the first optical fiber and an optical axis of the second optical fiber are substantially parallel with each other and substantially parallel to the optical axes of the first and second lenses;
   wherein adjustments of a vertical oblique angle with resnect to the optical axis of the first lens and a horizontal oblique angle with respect to the optical axis of the first lens are omitted respectively for the first optical fiber,
   wherein adjustments of a vertical oblique angle with respect to the optical axis of the second lens and a horizontal oblique angle with respect to the optical axis of the second lens are omitted respectively for the second optical fiber,
   wherein each of the vertical oblique angle θx and the horizontal oblique angle θy of the first optical fiber with respect to the optical axis of the first lens is set within 0.2 degrees, and
   wherein each of the vertical oblique angle θx and the horizontal oblique angle θy of the second optical fiber with respect to the optical axis of the second lens is set within 0.2 degrees.

2. The optical module according to claim 1, wherein the first lens includes a light emitting surface opposed to the optical device and for emitting the parallel light, the second lens includes a light receiving surface opposed to the function device and for receiving the transmitted parallel light, and
   a distance between a center of the light emitting surface of the first lens and a center of the light receiving surface of the second lens is equal to 1 mm or less.

3. The optical module according to claim 1, wherein each of the first and the second lenses has a lens length larger than the corresponding lens diameter thereof, and
   each of the first and the second lenses has a cylindrical periphery whose center axis is parallel to the optical axis of the corresponding lens.

4. The optical module according to claim 1, wherein each of the first and second lenses is a gradient index rod lens having a refractive index distributed in a radial direction of a circular section perpendicular with respect to the optical axis.

5. The optical module according to claim 1, further comprising, a circular cylinder tube for housing the first and the second lenses so that the axis of the first lens and the axis of the second lens are substantially coincident with each other.

6. The optical module according to claim 1, further comprising, a housing groove having a V-shape cross section and for housing the first lens and the second lens so that the axis of the first lens and the axis of the second lens are substantially coincident with each other.

7. The optical module according to claim 1, further comprising, a first capillary optically coupled with the first lens and for supporting the optical fiber, and a second capillary coupled with the second lens and for supporting the second optical fiber, and
   wherein an outside diameter of at least either of the first and the second capillaries is equal to an outside diameter of the corresponding lens.

8. The optical module according to claim 1, wherein the core adjustments for positioning of the first and the second optical fibers are performed only in the X, Y and Z directions.

9. An optical module comprising:
   a first optical fiber;
   a first lens, optically coupled with the first optical fiber, for receiving an incident light from the first optical fiber and converting the incident light into a parallel light;
   an optical device for receiving the parallel light and performing predetermined optical processing on the parallel light;
   a second lens for receiving a transmitted parallel light from the optical device and converging the transmitted parallel light to produce an outgoing light;
   a second optical fiber, optically coupled with the second lens, for receiving the outgoing light;
   wherein an optical axis of the first lens and an optical axis of the second lens are substantially coincident with each other, and an optical axis of the first optical fiber and an optical axis of the second optical fiber are substantially parallel with each other and are substantially parallel to the optical axes of the first and the second lenses, a third optical fiber, optically coupled with the first lens, and having an axis in parallel with the optical axis of the first optical fiber and separated as much as a predetermined distance; and wherein the first lens converges the parallel light reflected by the optical device to produce a reflected outgoing light, and provides the reflected outgoing light to the third optical fiber;

wherein adjustments of a vertical oblique angle with respect to the optical axis of the first lens and a horizontal oblique angle with respect to the optical axis of the first lens are omitted respectively for each of the first and the third optical fibers, wherein each of the vertical oblique angle θx and the horizontal oblique angle θv of the third optical fiber with respect to the optical axis of the first lens is set within 0.2 degrees.

10. The optical module according to claim 9, wherein the core adjustments for positioning the first, the second, and the third optical fibers are performed only in the X, Y and Z directions.

11. An optical module, comprising:

a first optical fiber;

a first lens, optically coupled with the first optical fiber, for receiving an incident light from the first optical fiber and converting the incident light into a parallel light;

an optical device for receiving the parallel light and performing predetermined optical processing on the parallel light;

a second lens for receiving a transmitted parallel light from the optical device and converging the transmitted parallel light to produce an outgoing light;

a second optical fiber, optically coupled with the second lens, for receiving the outgoing light, wherein an optical axis of the first lens and an optical axis of the second lens are substantially coincident with each other, and an optical axis of the first optical fiber and an optical axis of the second optical fiber are substantially parallel with each other and substantially parallel to the optical axes of the first and the second lenses; and a third optical fiber, optically coupled with the first lens, and having an axis in parallel with the optical axis of the first optical fiber and separated as much as a predetermined distance, wherein the first lens converges the parallel light reflected by the optical device to produce a reflected outgoing light, and provides the reflected outgoing light to the third optical fiber, wherein adjustments of a vertical oblique angle with respect to the optical axis of the first lens and a horizontal oblique angle with respect to the optical axis of the first lens are omitted respectively for each of the first and the third optical fibers, wherein adjustments of a vertical oblique angle with respect to the optical axis of the second lens and a horizontal oblique angle with respect to the optical axis of the second lens are omitted respectively for the second optical fiber, wherein each of the vertical oblique angle θx and the horizontal oblique angle θy of the first and the third optical fiber with respect to the optical axis of the first lens is set within 0.2 degrees, and each of the vertical oblique angle θx and the horizontal oblique angle θy of the second optical fiber with respect to the optical axis of the second lens is set within 0.2 degrees.

12. The optical module according to claim 11, wherein the first lens has a focal point with a focal distance f, and a displacement amount of the optical device from the focal point of the first lens is within +/−25% of the focal distance f of the first lens.

13. The optical module according to claim 11, wherein the first lens includes a first oblique plane which inclines with respect to the optical axis of the first lens and is optically coupled with the first optical fiber, the second lens includes a second oblique plane which inclines with respect to the optical axis of the second lens and is optically coupled with the second optical fiber, a relative rotational displacement angle θz of the first and the second oblique planes is defined about the optical axes of the first and the second lenses as a rotational axis, and the relative rotational displacement angle θz of the first and the second oblique planes is set within 2 degrees.

14. The optical module according to claim 11, wherein a vertical inclination of the first lens with respect to the optical axis of the first lens is set within 1.5 degrees, and a vertical inclination of the second lens with respect to the optical axis of the second lens is set within 1.5 degrees.

15. The optical module according to claim 14, wherein the first lens has a light emitting end face opposed to the second lens for emitting the parallel light, the second lens has a light receiving end face opposed to the first lens for receiving the parallel light, each of the vertical oblique angle θx and the horizontal oblique angle θy of the emitting end face of the first optical lens with respect to the optical axis of the first lens is set within 10 degrees, and each of the vertical oblique angle θx and the horizontal oblique angle θy of the incident end face of the second lens with respect to the optical axis of the second lens is set within 10 degrees.

16. The optical module according to claim 15, wherein the first lens includes a first coupling end face with which the first optical fiber is optically coupled, the second lens includes a second coupling end face with which the second optical fiber is optically coupled, each of the vertical oblique angle θx and the horizontal oblique angle θy of the coupling end face of the first lens with respect to the optical axis of the first lens is set within 2.5 degrees, and each of the vertical oblique angle θx and the horizontal oblique angle θy of the coupling end face of the second lens with respect to the optical axis of the second lens is set within 2.5 degrees.

17. The optical module according to claim 11, wherein core adjustments for positioning the first, the second, and the third optical fibers are performed only in the X, Y and Z directions.

18. An optical module, comprising:

a first optical fiber;

a first lens, optically coupled with the first optical fiber, for receiving an incident light from the first optical fiber and converting the incident light into a parallel light;

an optical device for receiving the parallel light and performing predetermined optical processing on the parallel light;

a second lens for receiving a transmitted parallel light from the optical device and converging the transmitted parallel light to produce an outgoing light;

a second optical fiber, optically coupled with the second lens, for receiving the outgoing light, wherein an optical axis of the first lens and an optical axis of the second lens are substantially coincident with each other, and an optical axis of the first optical fiber and an optical axis of the second optical fiber are substantially parallel with each other and substantially parallel to the optical axes of the first and the second lenses; and a third optical fiber, optically coupled with the first lens, and having an axis in parallel with the optical axis of the first optical fiber and separated as much as a predetermined distance, wherein the first lens converges the parallel light reflected by the optical device to produce a reflected outgoing light, and provides the reflected outgoing light to the third optical fiber, wherein adjustments of a vertical oblique angle with respect to the optical axis of the first lens and a horizontal oblique angle with respect to the optical axis of the first lens are omitted respectively for the first optical fiber, wherein adjustments of a vertical oblique angle with respect to the optical axis of the second lens and a horizontal oblique angle with respect to the optical axis of the second lens are omitted respectively for the second optical fiber, wherein each of the vertical oblique angle θx and the horizontal oblique angle θy of the first and the third optical fiber with respect to the optical axis of the first lens is set within 0.2 degrees, each of a vertical oblique angle θx and a horizontal oblique angle θy of the second optical fiber with respect to the optical axis of the second lens is set within 0.2 degrees respectively, each of the first lens and the second lens has a focal point with the focal distance f, and a distance between the first lens and the second lens is within a range of 2f+/−2f/4.

19. The optical module according to claim 18, wherein a displacement between the optical axis of the first lens and optical axis of the second lens is set within 2.5% of the focal distance f.

20. The optical module according to claim 18, wherein the core adjustments for positioning the first, the second, and the third optical fibers are performed only in the X, Y and Z directions.

21. An optical module, comprising:

a first optical fiber;

a first lens, optically coupled with the first optical fiber, for receiving an incident light from the first optical fiber and converting the incident light into a parallel light;

an optical device for receiving the parallel light and performing predetermined optical processing on the parallel light;

a second lens for receiving a transmitted parallel light from the optical device and converging the transmitted parallel light to produce an outgoing light;

a second optical fiber, optically coupled with the second lens, for receiving the outgoing light, wherein an optical axis of the first lens and an optical axis of the second lens are substantially coincident with each other, and an optical axis of the first optical fiber and an optical axis of the second optical are substantially parallel with each other and substantially parallel to the optical axes of the first and the second lenses; and a third optical fiber, optically coupled with the first lens, and having an axis in parallel with the optical axis of the first optical fiber and separated as much as a predetermined distance, wherein the first lens converges the parallel light reflected by the optical device to produce a reflected outgoing light, and provides the reflected outgoing light to the third optical fiber, wherein adjustments of a vertical oblique angle with respect to the optical axis of the first lens and a horizontal oblique angle with respect to the optical axis of the first lens are omitted respectively for each of the first and the third optical fibers, wherein adjustments of a vertical oblique angle with respect to the optical axis of the second lens and a horizontal oblique angle with respect to the optical axis of the second lens are omitted respectively for the second optical fiber, wherein each of the vertical oblique angle θx and the horizontal oblique angle θy of the first and the third optical fiber with respect to the optical axis of the first lens is set within 0.2 degrees, each of the vertical oblique angle θx and the horizontal oblique angle θy of the second optical fiber with respect to the optical axis of the second lens is set within 0.2 degrees, each of the first lens and the second lens has the focal point with the focal distance f, and a displacement between the optical axis of the first lens and the optical axis of the second lens is set within 2.5% of the focal distance f.

22. The optical module according to claim 21, wherein the core adjustments for positioning the first, the second, and the third optical fibers are performed only in the X, Y and Z directions.

23. A method for assembling an optical module, the optical module comprising:

a first optical fiber; a first lens, optically coupled with the first optical fiber, for receiving an incident light from the first optical fiber and converting the incident light into a parallel light; an optical device for receiving the parallel light and performing predetermined optical processing on the parallel light; a second lens for receiving a transmitted parallel light from the optical device and converging the transmitted parallel light to produce an outgoing light; and a second optical fiber, optically coupled with the second lens, for receiving the outgoing light; the method comprising the steps of:

making an optical axis of the first lens and an optical axis of the second lens coincide with each other;

securing the optical device to a predetermined position between the first and second lenses;

securing the first and the second lenses so that a distance between a center of a light emitting face of the first lens and a center of a light receiving face of the second lens opposed to the first lens becomes a predetermined value;

arranging the first and the second optical fibers in parallel with optical axes of the first and the second lenses;

introducing a light having a predetermined wavelength and transmitting through the optical device into the first lens from the first optical fiber;

adjusting at least either of a relative position between the first optical fiber and the first lens and a relative position between the second optical fiber and the second lens in the same direction (z) as an optical axis of the lens and in two directions (x, y) perpendicular to the optical axis thereof so that a light amount which enters the second optical fiber becomes larger than a predetermined value, wherein adjustment operations of a vertical oblique angle with respect to the optical axis of the of the first lens and a horizontal oblique angle with respect to the optical axis of the first lens are omitted respectively for the first optical fiber, wherein adjustment operations of a vertical oblique angle with respect to the optical axis of the second lens and a horizontal oblique angle with respect to the optical axis of the second lens are omitted respectively for the second optical fiber; and securing a whole optical module by keeping the adjusted conditions.

24. The method for assembling an optical module according to claim 23, wherein the step for securing the lens is securing the first and the second lenses so that a predetermined value of a distance between a center of a light emitting face of the first lens and a center of a light receiving surface of the second lens opposed to the first lens is 1 mm or less.

25. The method for assembling an optical module according to claim 23, wherein the steps of adjusting the relative positions are performed only in the X, Y and Z directions.

26. A method for assembling an optical module, the optical module comprising: a first optical fiber; a first lens, optically coupled with the first optical fiber, for receiving an incident light from the first optical fiber and converting the incident light into a parallel light; an optical device, for receiving the parallel light and performing predetermined optical processing on the parallel light; a third optical fiber, optically coupled with the first lens, and having an axis in parallel with the optical axis of the first optical fiber and separated as much as a predetermined distance; a second lens, for receiving a transmitted parallel light from the optical device and converging the transmitted parallel light to produce an outgoing light; and a second optical fiber, optically coupled with the second lens, for receiving the outgoing light;

wherein the first lens converges the parallel light reflected by the optical device, produces a reflected outgoing light, and provides the reflected outgoing light to the third optical fiber, the method comprising the steps of:

making an optical axis of a first lens and an optical axis of a second lens substantially coincident with each other;

securing the optical device to a predetermined position between the first and the second lenses;

securing the first and the second lenses to that a distance between a center of a light emitting face of the first lens and a center of a light receiving surface of the second lens opposed to the first lens becomes a predetermined value;

arranging the first and the second optical fibers in parallel with optical axes of the first and the second lenses;

introducing a light having a predetermined wavelength reflected by the optical device and a light having a predetermined wavelength transmitting through the optical device separately or concurrently into the first lens from the first optical fiber;

adjusting a relative position between the first optical fiber and the first lens in the same direction (z) as an optical axis of the lens and in two directions (x, y) perpendicular to the optical axis thereof so that a light amount which enters the third optical fiber becomes larger than a predetermined value;

adjusting a relative position between the second optical fiber and the second lens in the same direction (z) as an optical axis of the lens and in two vertical directions (x, y) to the optical axis thereof so that a light amount which enters the second optical fiber becomes larger than a predetermined value, wherein adjustments of a vertical oblique angle with respect to the optical axis of the first lens and a horizontal oblique angle with respect to the optical axis of the first lens are omitted respectively for the first optical fiber, wherein adjustments of a vertical oblique angle with respect to the optical axis of the second lens and a horizontal oblique angle with respect to the optical axis of the second lens are omitted respectively for the second optical fiber; and securing a whole optical module keeping the adjusted conditions.

27. The method for assembling an optical module according to claim 26, wherein the steps of adjusting the relative positions are performed only in the X, Y and Z directions.

28. A method for assembling an optical module, the optical module comprising: a first optical fiber; a first lens, optically coupled with the first optical fiber, for receiving an incident light from the first optical fiber and converting the incident light into a parallel light; an optical device, for receiving the parallel light and performing predetermined optical processing on the parallel light; a third optical fiber, optically coupled the first lens, and having an axis in parallel with the optical axis of the first optical fiber and separated as much as a predetermined distance; a second lens, for receiving a transmitted parallel light from the optical device and converging the transmitted parallel light to produce an outgoing light; and a second optical fiber, optically coupled with the second lens, for receiving the outgoing light;

wherein the first lens has a focal point with a focal distance f, converges the parallel light reflected by the optical device, produce a reflected outgoing light, and provides the reflected outgoing light to the third optical fiber, the method comprising the steps of:

arranging the first lens and the second lens so that an optical axis of the first lens and an optical axis of the second lens are substantially coincident with each other;

arranging the optical device at a predetermined position between the first lens and the second lens so that a displacement amount from a focal point of the first lens is within +/−25% of a focal length of the first lens;

coupling the first and the third optical fibers with the first lens so that each of a vertical oblique angle θx and a horizontal oblique angle θy with respect to the optical axis of the first lens is within 0.2 degrees, wherein the coupling step includes adjusting a relative position between the first and the third optical fibers and the first lens in the same direction (z) as an optical axis of the lens and in two directions (x, y) perpendicular to the optical axis thereof; and coupling the second optical fiber with the second lens so that each of a vertical oblique angle θx and a horizontal oblique angle θy with respect to the optical axis of the second lens is within 0.2 degrees, wherein the coupling step includes adjusting a relative position between the second optical fiber and the second lens in the same direction (z) as an optical axis of the lens and in two vertical directions (x, y) to the optical axis thereof, wherein adjustment operations of the vertical oblique angle and the horizontal oblique angle are omitted respectively for each of the first and the second optical fibers.

29. The method for assembling the optical module according to claim 28, wherein the second lens has a focal point with a focal distance f, the step for arranging the lens includes arranging the first lens and the second lens so that a distance between the first lens and the second lends (WD) is within a range of 2f+/−2f/4.

30. The method for assembling the optical module according to claim 29, wherein the step of arranging the lens includes arranging the first lens and the second lens so that a displacement between an optical axis of the first lens and an optical axis of the second lens is within a range of 2.5% of the focal length f.

31. The method for assembling the optical module according to claim 28, wherein the first lens includes a first oblique plane which inclines with respect to the optical axis of the first lens and is optically coupled with the first optical fiber, and the second lens includes a second oblique plane which inclines with respect to the optical axis of the second lens and is optically coupled with the second optical fiber, and a relative rotational displacement angle $\theta z$ of the first and the second oblique planes is defined about the optical axes of the first and the second lenses as a rotation axis, and the step for arranging the lens includes arranging the first lens and the second lens so that the relative rotational displacement angle $\theta z$ of the first and the second oblique planes is within 20 degrees.

32. The method for assembling the optical module according to claim 28, wherein the step for arranging the lens includes to arrange the first lens and the second lens so that a vertical inclination of the first lens with respect to the optical axis of the first lens is within 1.5 degrees, and a vertical inclination of the second lens with respect to the optical axis of the second lens is within 1.5 degrees.

33. The method for assembling the optical module according to claim 32, wherein the first lens opposes to the second lens and has an emitting end face to emit the parallel light, the second lens opposes to the first lens and has an incident end face to introduce the parallel light, the step for arranging the lens, further comprising the steps of:

arranging the first lens so that each of the vertical oblique angle $\theta x$ and the horizontal oblique angle $\theta y$ of the emitting end face of the first lens with respect to the optical axis of the first lens is within 10 degrees; and arranging each of the vertical oblique angle $\theta x$ and the horizontal oblique angle $\theta y$ of the incident end face of the second lens with respect to the optical axis of the second lens is set within 10 degrees.

34. The method for assembling the optical module according to claim 33, wherein the first lens includes a first coupling end face with which the first optical fiber is optically coupled, and $\theta x$ and the horizontal oblique angle $\theta y$ of the coupling end face of the first lens with respect to the optical axis of the first lens is within 2.5 degrees; and arranging the second lens so that each of the vertical oblique angle $\theta x$ and the horizontal oblique angle $\theta y$ of the coupling end face of the second lens with respect to the optical axis of the second lens is within 2.5 degrees.

35. The method for assembling an optical module according to claim 28, wherein the steps of adjusting the relative positions are performed only in the X, Y and Z directions.

36. An optical module, comprising:

a first optical fiber;

a first lens, optically coupled with the first optical fiber, for receiving an incident light from the first optical fiber and converting the incident light into a parallel light;

an optical device for receiving the parallel light and performing predetermined optical processing on the parallel light;

a second lens for receiving a transmitted parallel light from the optical device and converging the transmitted parallel light to produce an outgoing light;

a second optical fiber, optically coupled with the second lens, for receiving the outgoing light;

wherein an optical axis of the first lens and an optical axis of the second lens are substantially coincident with each other, and an optical axis of the first optical fiber and an optical axis of the second optical fiber are substantially parallel with each other and substantially parallel to the optical axes of the first and second lenses;

wherein the core adjustments for positioning the first and the second optical fibers are performed only in the X, Y and Z directions;

wherein each of the vertical oblique angle ex and the horizontal oblique angle $\theta y$ of the first optical fiber with respect to the optical axis of the first lens is set within 0.2 degrees, and wherein each of the vertical oblique angle $\theta x$ and the horizontal oblique angle $\theta y$ of the second optical fiber with respect to the optical axis of the second lens is set within 0.2 degrees.

37. An optical module comprising:

a first optical fiber;

a first lens, optically coupled with the first optical fiber, for receiving an incident light from the first optical fiber and converting the incident light into a parallel light;

an optical device for receiving the parallel light and performing predetermined optical processing on the parallel light;

a second lens for receiving a transmitted parallel light from the optical device and converging the transmitted parallel light to produce an outgoing light;

a second optical fiber, optically coupled with the second lens, for receiving the outgoing light;

wherein an optical axis of the first lens and an optical axis of the second lens are substantially coincident with each other, and an optical axis of the first optical fiber and an optical axis of the second optical fiber are substantially parallel with each other and are substantially parallel to the optical axes of the first and the second lenses, a third optical fiber, optically coupled with the first lens, and having an axis in parallel with the optical axis of the first optical fiber and separated as much as a predetermined distance; and wherein the first lens converges the parallel light reflected by the optical device to produce a reflected outgoing light, and provides the reflected outgoing light to the third optical fiber;

wherein the core adjustments for positioning the first, the second and the third optical fibers are performed only in the X, Y and Z directions;

wherein each of the vertical oblique angle $\theta x$ and the horizontal oblique angle $\theta y$ of the third optical fiber with respect to the optical axis of the first lens is set within 0.2 degrees.

* * * * *

UNITED STATES PATENT AND TRADEMARK OFFICE
CERTIFICATE OF CORRECTION

PATENT NO. : 6,782,162 B2
DATED : August 24, 2004
INVENTOR(S) : Takashi Fukuzawa et al.

It is certified that error appears in the above-identified patent and that said Letters Patent is hereby corrected as shown below:

Column 21,
Line 56, delete "resnect" and insert therefor -- respect --.

Signed and Sealed this

Fourteenth Day of December, 2004

JON W. DUDAS
*Director of the United States Patent and Trademark Office*